United States Patent [19]

Seal

[11] Patent Number: 4,469,602

[45] Date of Patent: Sep. 4, 1984

[54] MICROCOMPUTER CONTROLLED DEMAND/SCHEDULED WATER SOFTENER HAVING AUTOMATIC RESIN BED SENSING

[75] Inventor: J. David Seal, Waukesha, Wis.

[73] Assignee: Autotrol Corporation, Milwaukee, Wis.

[21] Appl. No.: 502,967

[22] Filed: Jun. 10, 1983

Related U.S. Application Data

[63] Continuation-in-part of Ser. No. 412,279, Aug. 27, 1982, Pat. No. 4,426,294.

[51] Int. Cl.³ .............................................. B01J 49/00
[52] U.S. Cl. ..................................... 210/662; 210/85; 210/89; 210/98; 210/140; 210/143; 364/502
[58] Field of Search ................. 210/662, 670, 687, 89, 210/98, 102, 103, 109, 140, 143, 190, 191, 269, 85; 364/500, 502

[56] References Cited

U.S. PATENT DOCUMENTS

| | | | |
|---|---|---|---|
| 4,237,538 | 12/1980 | Le Dall | 364/500 |
| 4,257,887 | 3/1981 | Rak et al. | 210/96.1 |
| 4,275,448 | 6/1981 | Le Dall | 364/500 |
| 4,332,678 | 6/1982 | Spiegl | 210/86 |
| 4,385,357 | 5/1983 | Davis et al. | 364/500 |

OTHER PUBLICATIONS

Operating Manual, "Compute-A-Save System", Water Refining Company, Middletown, Ohio, Jul. 1, 1978.
Sales Literature, "Water King", Sta-Rite Industries, Delafield, Wisc.
Sales Literature, "The Lindsay KNOW-IT-ALL", The Lindsay Corporation.

*Primary Examiner*—Ivars C. Cintins
*Attorney, Agent, or Firm*—Quarles & Brady

[57] ABSTRACT

An improved control for a water softener includes a resin bed sensor for sensing when the resin bed has been depleted to a predetermined percentage of the total resin bed treating capacity. The resin bed sensor is connected to a microcomputer which is also coupled to a flow meter to receive data therefrom indicative of the quantity of treated water leaving the water treatment device over a given period of time. When the resin bed sensor signals the microcomputer that the resin bed has been depleted to the predetermined capacity the microcomputer calculates the total softening capacity of the resin bed. Each day, the microcomputer computes both the total quantity of treated water consumed since the last regeneration and the remaining capcity of the resin bed. The microcomputer also maintains a record in memory of the previous 7 days' usage and the average usage is calculated to establish a soft water reserve value. Should the remaining resin bed capacity be less than the established soft water reserve, the regeneration is initiated.

9 Claims, 11 Drawing Figures

SODIUM STATE
(RESIN EXPANDED)

CALCIUM STATE
(RESIN SHRUNK)

MICROCOMPUTER CONTROLLED DEMAND/SCHEDULED WATER SOFTENER HAVING AUTOMATIC RESIN BED SENSING

RELATED APPLICATIONS

This application is a continuation-in-part of U.S. patent application Ser. No. 412,279 filed Aug. 27, 1982, now U.S. Pat. No. 4,426,294.

BACKGROUND OF THE INVENTION

This invention relates generally to a control unit for a resin bed type water softener and more particularly to an improved microcomputer-based control unit for a resin bed water softener which initiates regeneration of the water softener resin bed only when necessary.

The most common type of water softener is the ion exchange resin-type softener having a tank which holds a bed of resin through which the hard water is passed to remove undesirable minerals and other impurities. The capacity of the resin bed to absorb minerals and impurities is finite and it is thus necessary to periodically recharge or regenerate the resin bed with a regenerant, typically a brine solution so as to restore the capacity of the resin bed for further water treatment.

With the earliest types of water softeners regeneration was effected manually only after it was discovered that the treatment capacity of the resin bed has been exceeded and the water flowing therethrough was no longer soft. In an effort to eliminate the need for manual regeneration, water softener control systems were developed utilizing a mechanical clock which initiated water softener regeneration on a periodic basis, the frequency of such regeneration being set in accordance with the known capacity of the resin bed and the anticipated daily usage of soft water. While mechanical clock-type water softener control units have alleviated the need for manually regenerating the water softener resin bed, such water softener control units are subject to the disadvantage that by regenerating the water softener resin bed at fixed intervals, regeneration may actually be occurring too often if actual soft water consumption is less than the anticipated soft water consumption or not often enough when the actual soft water consumption exceeds the anticipated soft water consumption. Regenerating the water softener resin bed when sufficient capacity still exists to treat an amount of water equal to, or in excess of the anticipated soft water consumption, is wasteful of salt and the water needed in regeneration. Conversely, failure to regenerate the water softener resin bed after the resin bed capacity has diminished to a point below that required to treat the actual quantity of soft water demanded results in hard water leaving the water softener.

In an effort to better regulate the frequency of water softener resin bed regeneration, demand-type water softener control units have been developed which sense the remaining capacity of the water softener resin bed to soften water. Most present day demand-type water softener control units operate to initiate regeneration of the water softener resin bed at an off-peak time, usually 2:00 a.m., if the remaining capacity of the water softener resin bed, as sensed by the control, is less than that required to refine the amount of water which would likely be used prior to the next regeneration interval. While demand-type water softener control units do achieve better regulation of water softener resin bed regeneration than do mechanical clock-type water softener control units, the frequency at which such demand-type water softener control units initiate regeneration is dependent on the selected reserve value representing the anticipated amount of soft water which will be used prior to the next regeneration interval. Since the actual amount of soft water used will likely not remain constant, but will vary greatly from day to day, the chosen reserve value must be made large to assure that soft water will always be produced by the water softener. Thus, regeneration will likely occur at a greater frequency than is actually necessary.

In an effort to overcome the disadvantages of prior art water softener control units, I previously invented the "Microcomputer Controlled Demand/Scheduled Water Softener" described and claimed in copending U.S. patent application Ser. No. 412,279 filed Aug. 27, 1982, now U.S. Pat. No. 4,426,294 and assigned to the assignee of the present invention. The water softener described in that patent application operates to initiate water softener regeneration when a reserve value, calculated in accordance with the average daily soft water consumption, exceeds the remaining treatment capacity of the water softener. The remaining treatment capacity of the water softener resin bed is mathematically calculated by first determining the total treating capacity of the water softener resin bed, in accordance with the ratio of the unit's softening capacity (as measured in kilograins) to the incoming water hardness (as measured in grains/gallon). The remaining capacity is then obtained from the difference between the total resin bed softening capacity (in gallons) and the quantity of water used since the previous regeneration.

The calculation of the remaining water softener resin bed capacity performed by the control of my previous invention assumes that the hardness of the water remains constant and that the total treating capacity of the water softener resin bed also remains constant. However, in practice the hardness of the water entering the water softener frequently varies for many reasons. Additionally, the treating capacity of the water softener resin bed itself may vary from the specified treating capacity because the treating capacity of the resin itself may vary from that specified by the manufacturer. Furthermore the amount of salt used for each regeneration may vary because of inaccuracies in the control operation. This will cause the capacity of the resin to vary proportionately. Also, the resin bed volume may not be accurately known so that the calculated remaining water softener resin bed capacity may not always equal the actual remaining water softener resin bed capacity.

In an effort to overcome these possible deficiencies, the present invention concerns an improved microcomputer-based water softener control unit which includes a resin bed sensor for sensing when approximately one-half, or any other portion, of the resin bed treating capacity has been depleted. Information from the resin bed sensor indicative of a predetermined depletion of the total resin bed refining capacity is processed by the microcomputer together with data indicative of the measured volume of the soft water consumed to yield a value, as measured in gallons, of the total resin bed capacity that results from the previous regeneration. This affords a much more accurate manner of determining the actual resin bed capacity than calculating the resin bed capacity using a theoretical value of the bed capacity and a single value of the water hardness. At a given time each day the microcomputer-based control system initiates water softer regeneration if a reserve value, calculated in accordance with the actual soft water consumption exceeds the remaining water softener resin bed capacity as previously determined from the resin sensor information and the measured value of soft water consumed.

BRIEF SUMMARY OF THE INVENTION

Briefly, in accordance with the preferred embodiment of the invention, I have provided an improved control for a water softener requiring periodic resin bed regeneration comprising a flow meter for detecting the quantity of softened water leaving the softener. My improved control also includes a particle bed sensor for sensing when the particle bed treating capacity of the softener has been depleted to a predetermined percentage (typically 50%) of the total particle bed treating capacity. A controller is coupled to the flow meter and in accordance with flow data supplied therefrom, the controller determines both the total quantity of treated water leaving the softener since the time of the previous regeneration and also determines the average of the daily consumption of treated water. In accordance with the average daily consumption of treated water, the controller establishes a treated water reserve representing the amount of treated water likely to be used during the interval prior to the next possible regeneration. During each operational cycle of the control which corresponds in duration to the scheduled period between possible regenerations, the control determines the total resin bed capacity which resulted from the previous regeneration in accordance with information from the resin bed sensor and the flow meter. From the total resin bed treating capacity, the amount of soft water consumed since the previous regeneration is subtracted to yield the remaining resin bed capacity. If the remaining resin bed treating capacity is less than the established reserve, then regeneration of the resin bed is initiated.

In accordance with another aspect of this invention, I have provided an improved method for controlling regeneration of the particle bed of a water treatment device commencing with the steps of measuring the quantity of water leaving the softener over a given period of time and then determining the actual daily average of the soft water consumed and the amount of soft water consumed since the last regeneration in accordance with the measured amounts of soft water leaving the softener. Thereafter, a reserve quantity of soft water is established from the calculated daily average of soft water consumption. The treating capacity of the resin bed is sensed to determine if a predetermined percentage of the total resin bed treating capacity has been depleted and if so, then the total resin bed treating capacity is established as a proportion of the quantity of treated water consumed since the previous regeneration. The remaining resin bed capacity is then determined by subtracting the quantity of water consumed from total resin bed capacity. Periodically, usually once a day during a period of infrequent water use, the remaining resin bed treating capacity is compared to the established treated water reserve and if the treated water reserve is greater than the remaining resin bed treating capacity, then regeneration is effected.

In the operation of my improved control, a microcomputer monitors the flow meter and records the actual amount of treated water leaving the water treatment device during the previous 24 hour period. Typically, 7 daily values are stored, to reflect the softened water usage over a week. From the stored daily values of treated water consumption the total amount of treated water consummed since the previous regeneration is determined as well as the actual average of the daily treated water consumption.

As the incoming water is treated by the resin bed of the softener, the treating capacity of the particle bed is being depleted. When the particle bed treating capacity has been depleted to a predetermined percentage, typically 50% of the total treating capacity, then the resin bed sensor alerts the microcomputer. From information provided by the resin bed sensor, the microcomputer establishes the total resin bed treating capacity as a proportion of the amount of treated water consummed since the previous regeneration. The calculated value of the total resin bed capacity obtained in this way replaces the total resin bed capacity value previously stored in the microcomputer memory during the last operation cycle so that the microcomputer memory always contains a total resin bed capacity value truly representative of the actual resin bed capacity. From the total resin bed capacity value stored in the microcomputer memory, the actual remaining resin bed capacity can easily be calculated by subtracting from the total resin bed capacity the amount of soft water consumed. At a designated time each day, typically at 2:00 a.m. or such other off hour as is desirable, the microcomputer compares the remaining resin bed treating capacity of the water softener to the established reserve. If the reserve is greater than the remaining resin bed capacity, then regeneration of the particle bed is initiated. Otherwise, the microcomputer only updates the data received from the flow meter and waits at least another 24 hour period before determining whether or not regeneration should occur.

It is an object of the present invention to provide an improved microcomputer-based water softener control unit which utilizes a sensor for sensing the treating capacity of the resin bed.

It is yet another object of the present invention to provide an improved microcomputer-based water softener control unit which initiates water softener resin bed regeneration when the remaining resin bed capacity, as sensed by the resin bed sensor, is less than a reserve value calculated in accordance with the actual soft water consumption so that regeneration of the resin bed only occurs when necessary, thereby achieving a savings of regenerant and water.

Another object of the present invention is to provide a water softener control which dynamically maintains a value of the total resin bed capacity during each operational cycle in accordance with the water hardness and other variables that in fact affect the resin bed capacity. In this way, greater efficiency is achieved.

Still another object of the present invention is to provide a control that requires no input information other than to set the internal microcomputer clock as to the time of day. All other information is determined automatically by the microcomputer from the flow meter and the resin bed sensor. This simplifies installation.

Yet another object of the invention is to provide a water softener control which indicates the efficacy of regeneration. Following initiation and completion of regeneration of the resin bed, the sensor may be interrogated by the microcomputer to determine if the regeneration was effective. If the sensor indicates that regeneration was not effective because of a failure of some part of the control or the associated control value or because of a lack of regenerant, then the failure is indicated so that the user may refill the regenerant supply or make the necessary repairs.

BRIEF DESCRIPTION OF THE DRAWINGS

The invention, both as to organization and method of operation, together with further objects and advantages thereof may best be understood by reference to the following description taken in conjunction with the accompanying drawings in which:

FIG. 4a is a cut away view of the water softener of FIG. 1 taken along lines 4a—4a.

DETAILED DESCRIPTION OF THE PREFERRED EMBODIMENT

Figure 1:
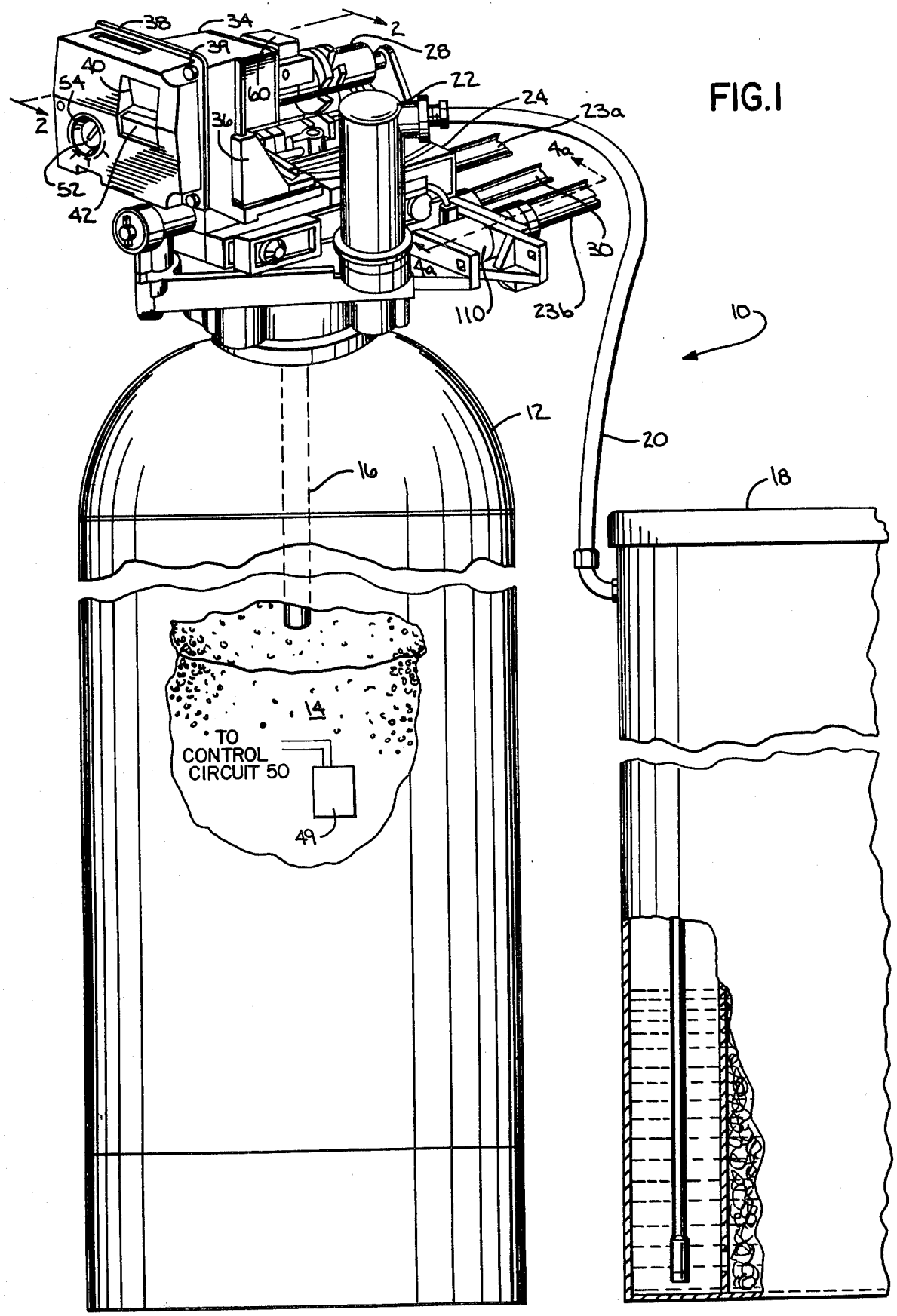
FIG. 1 is a resin bed type water softener embodying the control of the present invention.

Referring now to the Figures, FIG. 1 illustrates a resin bed-type water softener 10 which includes a tank 12 containing a resin bed 14. As incoming hard water enters the tank through an opening (not shown) in the top thereof, the water in the tank is forced through the resin bed and out the draw pipe 16 extending through the center of the resin bed so that water exiting via the draw pipe has been treated by the resin bed to remove minerals and other impurities. The capacity of resin bed 14 to absorb the minerals and impurities of the incoming hard water is finite, and depends on the treating capacity of the resin in the tank as measured in kilograins of hardness as well as the hardness of the incoming water as typically measured in grains per gallon. To regenerate the resin bed, once its treating capacity has been depleted, the resin bed is flushed with a sodium chloride brine solution so that the minerals and other impurities can be released from the resin bed and carried out of the tank. In practice, the brine solution is stored in a separate tank 18 and is admitted to the softener tank 12 during regeneration through a tube 20 and a air check valve 22.

Figure 2:
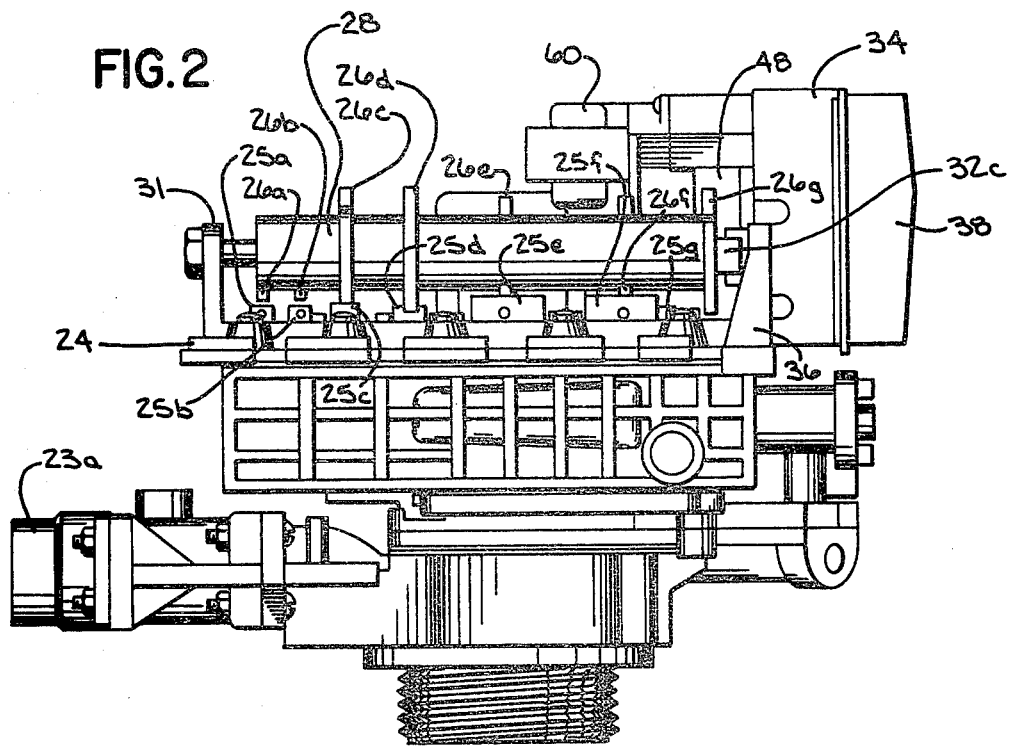
FIG. 2 is a side view of the control of the water softener illustrated in FIG. 1.

The control of brine flow into tank 12 from brine tank 18 as well as the control of hard water flowing into the tank via inlet 23a and the flow of soft water leaving the tank via outlet 23b is accomplished by a valve module 24 threaded on the top of tank 12 so as to be in communication with the tank inlet (not shown) and draw pipe 16. Valve module 24 typically comprises a control body such as manufactured by Autotrol Corporation, Glendale, Wis., under part No. 24N. As best illustrated in FIG. 2 valve module 24 includes seven disc-type valves 25a through 25g, respectively. In the present valve module, valves 25e and 25f are designated as the outlet and inlet valves, respectively, as the valves 25f and 25e each regulate the flow of hard water into tank 12 from inlet 23a and the flow of soft water up from draw pipe 16 (FIG. 1) out through to outlet 23b, respectively. Valve 25g serves to regulate the flow of brine from brine tank 18 into tank 12 and is therefore referred to as the brine valve. The valve 25d controls water flow in the valve module through a port (not shown) in communication with inlet 23a and outlet 23b so that when the inlet and outlet valves are closed, water may flow directly through the inlet and out the outlet while valve 25d is open. The remaining valves 25a, 25b and 25c serve to control the flow of water and brine from the tank into a drain conduit 30 (FIG. 1).

Figure 3:
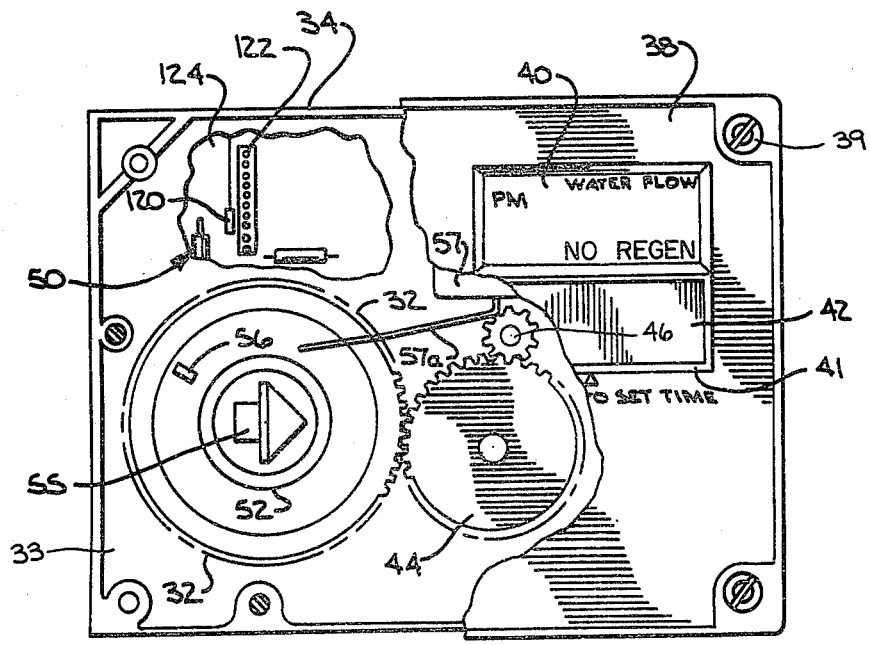
FIG. 3 is a front view of the control of the water softener illustrated in FIG. 1.

During a regeneration cycle, each of valves 25a through 25g is actuated at an appropriate interval by a separate one of the corresponding cams 26a through 26g carried on a cam shaft 28 when the cam shaft is rotated to bring the corresponding cam into contact with the valve. Cam shaft 28 is journaled at its rearend into a cam shaft support 31 extending upwardly from the valve module. The forward (rightward) end of cam shaft 28 has forwardly extending shank for engaging the "T" shaped slot in the rearward end of the outwardly extending shaft 32a of a gear 32 (FIG. 3). As best illustrated in FIG. 3, gear 32 is journaled for rotation within the cavity 33 of a control housing 34. Returning to FIG. 2, control housing 34 is slidably secured to the forward end of the valve module 24 by a pair of support guides 36 (FIGS. 1 and 2) which each engage complimentary flanges (not shown) on the exterior of the control housing.

What has been described thus far with respect to the construction and operation of the valve module 24 is well known in the art.

The cavity 33 (FIG. 3) within the forward end of the control housing 34 is closed by a cover 38 which is secured to the forward end of the control housing by screws 39 (illustrated in FIG. 3). Referring now to FIG. 3 which is a frontal view of control housing 34 showing portion of cover 38 cut away, cover 38 is generally opaque except for a window 40 which carries the indicia "PM" "WATER FLOW" and "NO REGEN". As will become clear hereinafter by reference to FIG. 4, window 40 allows displays within the cavity to display certain information as well as to illuminate the indicia on the window. Immediately below window 40 is a passageway 41 through the cover which has a spring biased button 42 protruding outwardly therethrough. As will also become clear by reference to FIG. 4, button 42 is depressed to set the time displayed by the display through window 40.

With a portion of cover 38 broken away in FIG. 3, it can be observed that not only is gear 32 journaled within the cavity 33, but an idler gear 44 is also journaled within cavity 33 and is in meshing engagement with gear 32. Idler gear 44 is driven by a gear 46 which is carried on the forward end of the shaft of motor 48, (FIG. 2); the motor being mounted on the rear of the control housing so that its shaft extends through the control housing and into the cavity to receive gear 46.

Motor 48 of FIG. 2, which is typically a 1 RPM A.C. clock motor, is energized with alternating current by a control circuit 50 of FIG. 4 (described hereinafter) when the control circuit determines, in accordance with a particular algorithm, that regeneration should be effected. Motor 48, when energized from control circuit 50, drives cam shaft 28 through gears 46, 44 and 32 to cause cams 26a through 26g to actuate a corresponding one of valves 25a through 25f, respectively. The cams 26a–26f are shaped such that valves 25a through 25f, respectively, are actuated in a particular sequence for a particular duration during a single revolution of the cam shaft so that the backwash, brining, slow rinse, and brine refill & purge steps, which are normally required to complete resin bed regeneration, are performed in the desired sequence. Following a single revolution of the cam shaft, the valves return to the service position so as to allow normal water flow through the softener.

As will be described in greater detail hereinafter, the control circuit 50 operates to effect regeneration of the resin bed 14 of FIG. 1, when a soft water reserve value, representing the amount of soft water likely to be used prior to the next possible regeneration interval, exceeds the remaining treating or refining capacity of the resin bed. In my previous water softener control, described in co-pending patent application Ser. No. 412,279, the remaining refining capacity of the resin bed was calculated in accordance with the difference between the total refining capacity of the resin bed (established by the ratio of resin bed capacity measured in kilograins of hardness to the incoming water hardness, in grains/gallon) and the amount of the soft water consumed since the previous regeneration. The operation of my previous water softener control thus assumes that the incoming water hardness and the resin bed capacity remain constant. However, in practice, neither the incoming water hardness, nor the water softener resin bed capacity are constant. Thus, the required amount of regenerant and water may vary because of inaccuracies of control operation.

To overcome this disadvantage, the water softener control of the present invention includes a resin bed sensor 49, typically located approximately half way down into the bed 14 as illustrated in FIG. 1 for providing an electrical indication when the refining capacity of resin bed 14 of FIG. 1 has been depleted to a predetermined percentage (typically 50%) of the total resin bed refining capacity. A better understanding of the resin bed sensor 49 may be gained by reference to FIGS. 3A and 3B which are cross sectional views of the resin bed sensor in its expanded and contracted state, respectively.

Figure 3A:
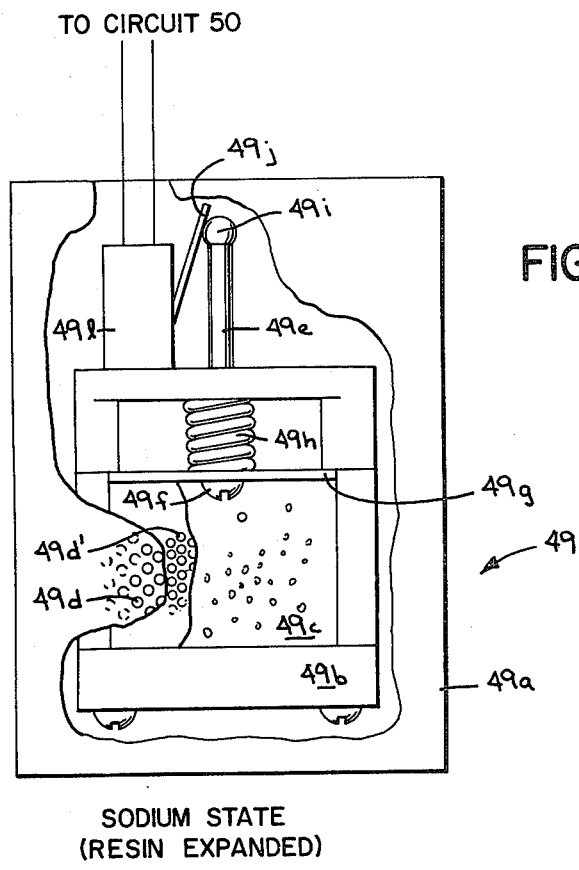
FIG. 3A is a cross sectional view of the resin bed sensor for sensing the remaining resin bed treating capacity, as shown in its expanded resin state.
Figure 3B:
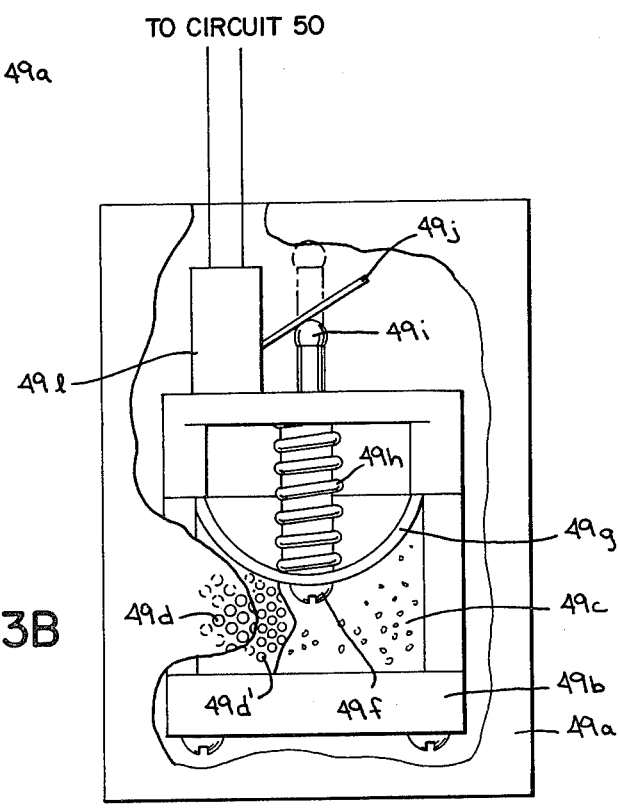
FIG. 3B is a cross sectional view of the particle bed sensor of FIG. 3A shown in its concentrated resin state.

Referring now to both FIGS. 3A and 3B, the resin bed sensor 49 comprises an outer housing 49a which is typically made from a water and brine impervious material such as plastic or the like. Within housing 49a is an interior housing 49b which contains a quantity of special resin 49c whose volume varies in accordance with the softness of the water exposed to it. Openings 49d are provided through the outer wall of the outer housing 49a and openings 49d' are provided in the outer wall of the inner housing 49b to allow the water within the tank 12 of FIG. 1 to be exposed to the special resin 49c held within housing 49b.

Extending vertically downwardly through the top wall of housing 49b into the interior of the inner housing is an arm 49e whose lower end is mounted by way of a screw 49f to a diaphragm 49g. A spring 49h is interposed between the top wall of the inner housing 49b and the diaphragm 49g to yieldably urge the diaphragm 49g against the volume of special resin 49c. As best illustrated in FIG. 3A, while the water passing through openings 49d in outer housing 49b is soft, the volume of special resin 49c is fully expanded so as to bias the diaphragm 49g against spring 49h. Arm 49e is thus urged to its upward-most position. While arm 49e remains at its upward-most position, the head 49i of the arm 49e bears against the leaf arm 49k of a leaf switch 49l to render the leaf switch non-conductive. Although not shown, means taking the form of a gasket or the like, is provided to seal the housing 49b within the interior of the housing 49a so that the water entering openings 49d only enters the interior of housing 49b in communication with the openings but does not enter the remaining portion of the interior of housing 49b. In this way, switch 49l remains unexposed to the water within the resin bed.

Referring now to FIG. 3B, if the water passing through openings 49d in the outer housing 49a and entering inner housing 49b is hard, then the special resin 49c shrinks in volume so that the diaphragm 49g is no longer urged by the volume of special resin 49c against spring 49h. The amount of shrinkage shown in FIG. 3B has been exaggerated for purposes of illustration. With the volume of the special resin now reduced, spring 49h urges the diaphragm downwardly so as to displace arm 49e to its lower-most position. With arm 49e at its lower-most position, the leaf arm 49j of the leaf switch 49l is no longer contacted by the head 49i of the arm so that switch 49 now becomes conductive. In practice, with the resin sensor 49 located approximately half way into the resin bed 14 within tank 12 of FIG. 1 switch 49l becomes conductive when the resin bed capacity has been depleted to approximately one-half (50%) of its original treating capacity.

It should be understood that the particular embodiment of sensor 49 described above is only exemplary and that other types of resin bed sensors could be utilized. For example, a resin bed sensor responsive to the water conductivity, such as disclosed in U.S. Pat. No. 4,257,887, could be utilized in place of resin bed sensor 49. Moreover, in certain instances, it may be desirable to locate resin bed sensor 49 outside of the resin tank and to feed water through the special resin 49c by way of connecting tubes (not shown).

Although water softener resin bed regeneration is normally effected when control circuit 50 energizes motor 48, there may be instances when manual regeneration is desired, To enable manual regeneration, gear 32 has a hub 52 extending forwardly of the gear and through an opening 54 (FIG. 1) in cover 38. Gear 32 and hub 52 are spring biased from shaft 32a so that when the hub 52 of the gear is pushed inwardly, gear 32 becomes disengaged from idler gear 44 so as to allow the cam shaft to be manually rotated upon rotation of the hub. As the hub is rotated either manually, or upon the gear 32 being driven by the motor 48, an arrow 55 on the hub points to indicia (not shown) on the face of cover 38 representing the various states of water softener operation, to indicate which step of the regeneration cycle is then being executed, or, whether valves are presently in the service position.

Protruding outwardly from the gear 32 is a member 56 which, as the gear rotates, comes into contact with the spring biased arm 57a of a leaf switch 57. Leaf switch 57 is connected to control circuit 50 in a manner described hereinafter. The switch is actuated either by member 56 as the gear is rotated or when the hub is simply depressed since the outward force of the member 56 keeps the spring biased arm 57a from normally moving downwardly to actuate the switch. When switch 57 is actuated, the control circuit initiates regeneration. Thus, regeneration can be effected not only by manually rotating hub 52 but by simply depressing the hub to activate switch 57.

Figure 4:
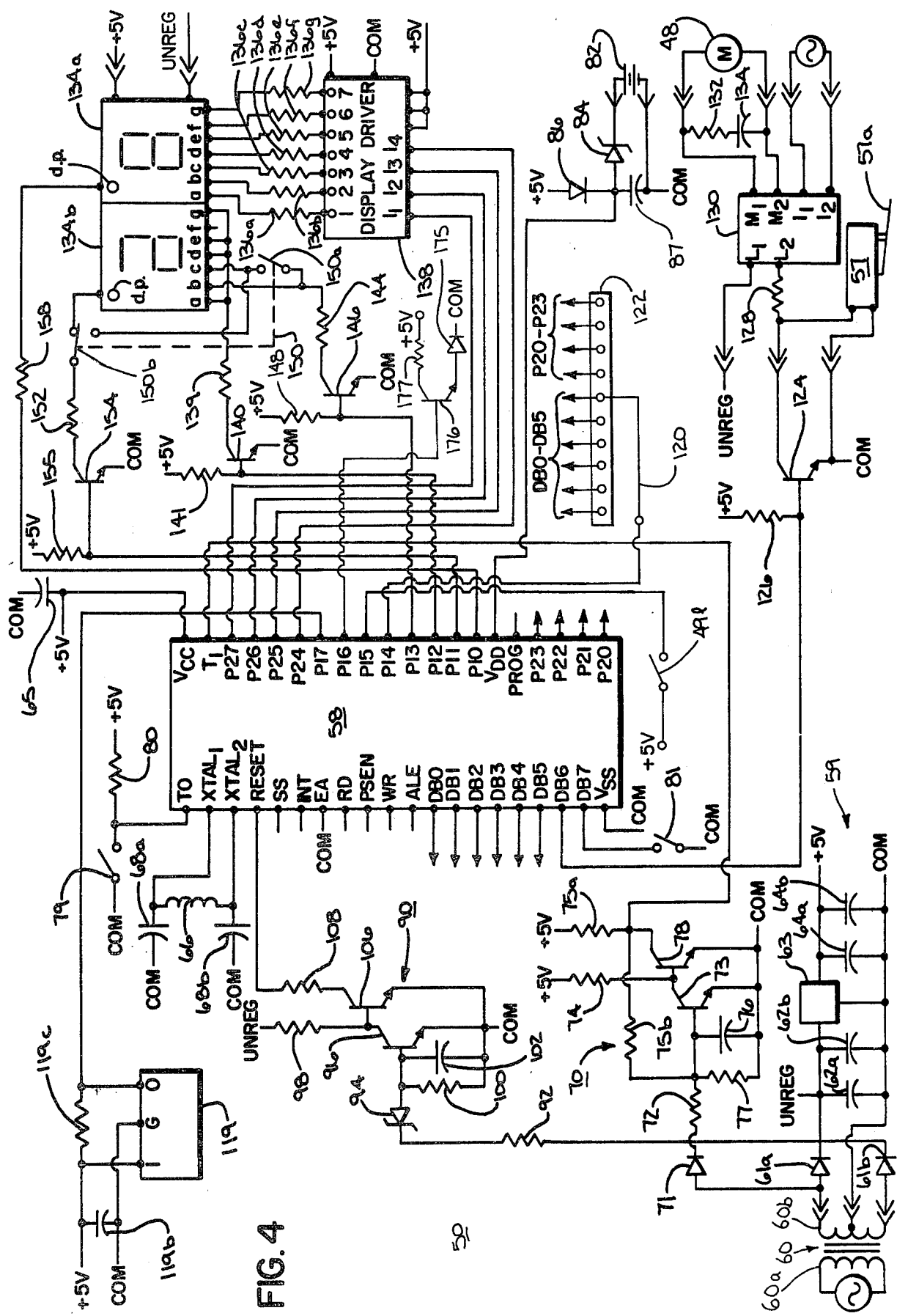
FIG. 4 is an electrical schematic diagram of the circuitry embodied in the control of the water softener illustrated in FIG. 1.

The details of control circuit 50 are set forth schematically in FIG. 4. At the heart of control circuit 50 is a data processing unit 58 which, in the presently preferred embodiment, takes the form of a single chip microcomputer such as a model 8048 microcomputer as manufactured by Intel Corporation, Santa Clara, Calif. Microcomputer 58 includes "on-board" random access memory for storing data previously entered to the microcomputer or developed during the course of operation thereof. Also, the microcomputer includes on-board read only memory in which is stored the operating program to be described in greater detail with respect to FIGS. 5A to 5D. This program controls the operation of the internal microcomputer arithmetic logic unit which performs the necessary calculations and logic determinations, to decide whether regeneration should be effected. In addition to the on-board memory and the arithmetic logic unit, microcomputer 58 also includes an internal timer which serves as a real time clock. For a further, more complete description of the Model 8048 microcomputer, reference should be had to the "MCS-48 User's Manual" published by Intel Corporation.

A 5 volt regulated d.c. voltage to energize microcomputer 58 is supplied to the microcomputer at its Vcc pin by a power supply 59 comprised of a transformer 60 whose primary winding 60a is coupled to a supply of 110-220 volt, 50-60 Hertz a.c. supply (not shown). Because of the lack of space within the cavity 33 for the transformer, transformer 60 is mounted to the rear of the control housing as shown in FIG. 2. The low voltage a.c. produced across the center tapped transformer secondary winding 60b when the primary is coupled to the a.c. supply voltage, is rectified by a pair of diodes 61a and 61b whose anodes are each coupled to one of opposite ends of the transformer secondary winding 60b. With the diode cathodes connected together, an unregulated d.c. voltage appears between the junction of the diode cathodes, hereafter referred to as the power supply unregulated voltage (unreg) output terminal and the transformer center tap, hereinafter referred to as the power supply common (com) terminal.

The unregulated d.c. voltage present between the unregulated voltage and common terminals of power supply is filtered by a pair of parallel coupled capacitors 62a and 62b before being supplied to a voltage regulator 63. The 5 volt regulated d.c. voltage produced at the output of the regulator, which is designated as the "+5 V" output of the power supply, is filtered by a pair of capacitances 64a and 64b coupled in parallel between the +5 V power supply terminal and the power supply common terminal before being supplied to pin Vcc of the microcomputer. Although the regulated 5 volt d.c. voltage produced by the power supply is well filtered, it is desirable to connect a filter capacitance 65 between microcomputer pin Vcc and the power supply common terminal. A completed circuit between the power supply and the microcomputer 58 is accomplished by connecting the microcomputer ground pin Vss to the power supply common terminal.

Within the microcomputer 58 is a master oscillator (not shown) whose periodic clock signals control the internal microcomputer timer and arithmetic logic unit. The frequency of this oscillator is determined from the reactance appearing across the microcomputer pins XTAL1 and XTAL2. In the present preferred embodiment, this reactance is established by a inductance 66 coupled across the XTAL1 and XTAL2 pins of microcomputer 58 and a pair of capacitances 68a and 68b each coupled between a separate one of the microcomputer XTAL1 and XTAL2 pins and the power supply common terminal. The power supply common terminal is also coupled to the microcomputer pin EA to assure that during microcomputer operation, all memory accesses by the internal arithmetic logic unit in response to periodic timing signals from the internal master oscillator are made from the internal random access and read only memories of the microcomputer.

The internal timer of the microcomputer, which as indicated serves as a real time clock, is strobed or clocked in accordance with the alternations of the a.c. supply voltage. Since the a.c. supply voltage is accurately maintained either at 50 or 60 Hz depending on the custom, the frequency of alternations of the a.c. supply voltage can be used as a basis of measuring real time. To strobe the internal microcomputer timer, a clocking circuit 70 is provided for supplying microcomputer at its T1 pin with a logic level voltage which changes logic states in accordance with the alternations of the a.c. supply voltage. Clocking circuit 70 includes a diode 71 and a resistance 72 serially coupled between the one of the two secondary winding terminals of transformer 60 and the base of a first transistor 73 whose collector-to-emitter portion is coupled in series with a resistance 74 between the +5 V and common terminals of power supply 59. Transistor 73 is also coupled at its base to the +5 V terminal of the power supply through a pair of serially coupled resistances 75a and 75b. Each time the a.c. voltage at the secondary 60b of transformer 60 undergoes an alternation, the transistor 73 is rendered conductive. A filter comprised of the parallel combination of a capacitance 76 and a resistance 77 filters stray noise to prevent false conduction of transistor 73.

A second transistor 78 has its base coupled to the junction between resistance 74 and transistor 73 and transistor 78 has its collector-to-emitter portion coupled between the junction resistances 75a and 75b and the power supply common terminal. The conduction of transistor is controlled by transistor 73 and when transistor 73 is conductive, transistor 73 shunts current from the base of transistor 78 to keep transistor 78 from conducting. While transistor 73 is nonconductive, transistor 78 is supplied with base current and becomes conductive. In this way transistor 78 acts as a logic inverter so that the logic level voltage appearing across transistor 78, which is supplied to the microcomputer at pin T1 to strobe the internal timer, will be logically inverse to the logic level voltage appearing across the collector-to-emitter portion of transistor 73.

In order for the internal microcomputer timer to keep the correct time, the timer must usually be initially set to the appropriate time. Setting of the timer is accomplished by closing a switch 79 coupled between the microcomputer timing input at pin T0 and the power supply common terminal input to force the voltage at the timing input to a logic low voltage level. In practice switch 79 is activated by depressing button 42 (FIG. 3) protruding through the cover 38 (FIG. 3). While switch 79 is open, the timing input is maintained at a high logic level voltage via a resistance 80 coupled between the pin T0 and the +5 V power supply terminal.

Because the internal microcomputer timer counts time in accordance with the alternations of the a.c.

supply voltage as processed by clocking circuit 70, the microcomputer must be alerted as to whether the a.c. supply voltage frequency is 60 Hz. as is the case in the United States or 50 Hz. as is the case in many European countries. To alert the microcomputer as to the a.c. supply voltage frequency, a switch 81 is coupled between the second highest order microcomputer data bus line (7) which terminates at pin $DB_7$ and the power supply common terminal. After determining whether or not that bus is at a ground potential (i.e. whether or not switch 79 is closed) the microcomputer then knows whether the a.c. supply voltage is 50 or 60 Hz., respectively.

Normally, the microcomputer power is provided from power supply 59, and the timing signal for clocking the internal timer is provided from the clocking circuit 70. However, should the a.c. supply voltage fail, then not only does the clocking circuit fail to supply periodic pulses, but more importantly the internal microcomputer memories which store collected data may be erased. To keep at least the microcomputer memories from being erased, a battery 82 is coupled at its positive terminal via Zener diode 84 to the standby voltage input pin VDD of the microcomputer 58. The negative terminal of the battery is coupled to the power supply common terminal. While there is an a.c. voltage at the input to the power supply 59, a regulated d.c. voltage is provided to pin $V_{dd}$ from the power supply via a diode 86.

Usually the battery voltage is less than the sum of the break over voltage of the Zener diode 34 and the voltage drop across diode 86 but is greater than the Zener diode break over voltage. Thus, only when the supply voltage fails will battery 82 render Zener diode 84 conductive and supply voltage to the microcomputer. Note that a capacitance could be substituted as an energy storage device in place of battery 82. A capacitor 87 is connected between microcomputer pin $V_{dd}$ and the power supply common terminal to filter any noise.

Once the a.c. supply does fail, resetting of the microcomputer is usually necessary. A reset circuit 90 for accomplishing resetting of microcomputer upon "power up" includes a resistance 92 and a Zener diode 94 coupled in series between the power supply unregulated voltage output terminal and the base of a first transistor 96 whose collector-to-emitter portion is coupled in series with a resistance 98 between the power supply unregulated voltage output terminal and the power supply common terminal. The base-emitter junction of the transistor is shunted by the parallel combination of a resistance 100 and a capacitance 102.

A second transistor 106 has its base coupled to the junction between resistance 98 and transistor 96 and transistor 106 has its collector-to-emitter portion coupled in series with resistance 108 between the microcomputer reset input terminating at the RESET pin and the power supply common terminal. During intervals while a.c. is supplied to the power supply, transistor 96 is rendered conductive to divert current from the base of transistor 106 to keep it from conducting, thereby keeping the impedance at the microcomputer reset input high. However, once the a.c. supply voltage fails and then is reapplied to the power supply, transistor 96, which had become nonconductive once the a.c. supply voltage failed, will not again become conductive until the unregulated output voltage of the power supply 59 reaches the threshold voltage of Zener diode 94. In the meantime, with transistor 96 temporarily nonconductive, transistor 106 becomes conductive once the power is reapplied to provide a low impedance path between the microcomputer reset input and the power supply common terminal to reset the microcomputer.

As will become better understood by reference to flow chart FIGS. 5A-5D, microcomputer 58 is programmed to initiate water softener resin bed regeneration when the reamining resin bed treating capacity, as determined from the amount of water used since the previous regeneration and the water hardness, is less than a reserve value circulated as a percentage of the actual average daily soft water consumption.

Figure 4A:
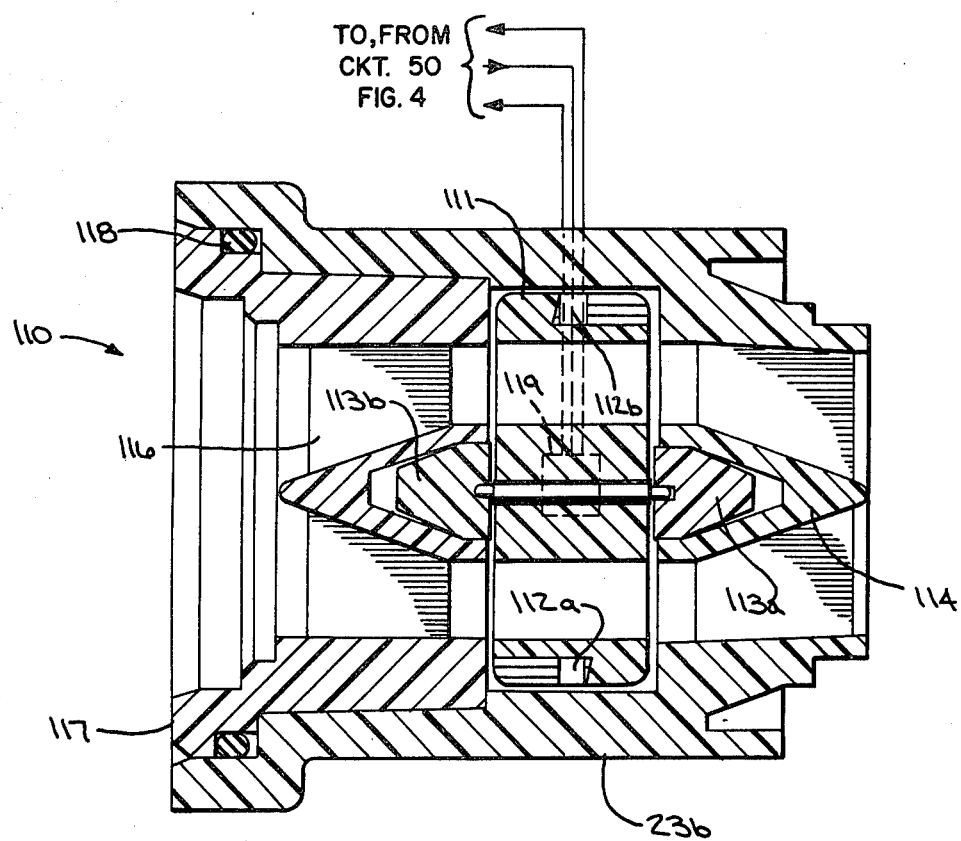

Input data representing the flow of softened water leaving resin tank 12 of FIG. 1 is supplied from a flowmeter 110 (FIG. 1) disposed in the outlet 23b to the highest order line (17) of the first of the two ports of microcomputer 58 terminating at pin $P_{17}$. Referring now to FIG. 4a, which is a cut away view of the inlet 23b taken along lines 4a-4a of FIG. 1, flowmeter 110 is comprised of a turbine 111 having a magnet 112a embedded in the periphery of the turbine so that the south magnetic pole is facing radially outwardly. A counterweight 112b is located in the turbine periphery opposite magnet 112a to balance the turbine. The turbine is journaled at its rightward most end by a first bearing 113a secured in a bearing strut 114 disposed in the righward end of the outlet. Turbine 111 is journaled at its leftward most end by a bearing 113b carried in a bearing strut 116 that is disposed in the interior bore of a collar 117 which is dimensioned to be received in the leftward most end of the outlet. An O ring 118 is disposed in sealing engagement between the collar and the outlet to prevent water leakage. As water flows through the outlet, the force of the water drives the turbine 111, so that the magnet passes a Hall Effect switch 119 disposed in a wall of the outlet adjacent to the turbine.

Returning now to FIG. 4, Hall Effect switch 119, which typically comprises a model UGN 3040 T. Hall Effect switch as manufactured by Sprague Electric Co., Concord, N.H., is coupled at its input terminal I and its ground terminal G to the +5 V and common terminal of the power supply. A capacitance 119b shunts the I and G input level to filter any stray noise. When energized in this manner, the Hall Effect switch generates a high logic level voltage at its output terminal each time the magnet of the turbine passes the switch. This voltage is supplied to the microcomputer at line 17 of the second microcomputer port terminating at the microcomputer pin $P_{17}$. By counting the number of voltage level transistions, the microcomputer can determine the turbine velocity which is directly related to the flow rate of water leaving the softener. A pull up resistance 119c couples the microcomputer pin $P_{17}$ to the +5 V power supply terminal to prevent random noise from causing an erroneous flow measurement.

Input data, indicative of the remaining refining capacity of the resin bed 14 is supplied to the microcomputer on line 15 by coupling the microcomputer pin $P_{15}$ through switch 49l to the +5 volt terminal of the power supply. When switch 49l is closed, as occurs when the refining capacity of the resin bed 14 has been depleted to 50% of its original refining capacity, then, the microcomputer 58 is supplied at its pin $P_{15}$ with a +5 volt d.c. voltage. As will be better understood from a description of the program illustrated in flow chart form in FIGS. 5A-5D, when switch 49l is closed, then, the microcomputer 58 establishes the total refining capacity of the resin bed 14 as a proportion of the amount of water consumed since the previous regeneration. In this way, the microcomputer 58 establishes a more accurate value for the total resin bed refining capacity than is achieved by calculating the resin bed refining capacity in accordance with the ratio of the theoretical resin bed refining capacity and a single water hardness value.

Normally, all the input information required for the microcomputer 58 to control the regeneration of the resin bed 14 is provided from the Hall Effect switch 119 of the flow meter 110 and from the microswitch 49l of the resin sensor 49. However, should a fault occur in the operation of the microcomputer, it is usually desirable to enter one or more test instructions to aid in the diagnosis of the fault. Input test commands to alter the microcomputer operation are entered to the microcomputer by connecting one one more of the data bus pins $DB_0$–$DB_5$ and port pins $P_{20}$–$P_{23}$ to the microcomputer port pin $P_{14}$ via jumper 120. Referring now to FIG. 3, to facilitate entry of the test command in this manner, each of the microcomputer port pins $P_{20}$–$P_{23}$ and the microcomputer data bus pins $DB_0$–$DB_5$ are connected to each of the terminals of a terminal block 122 mounted on the circuit board 124 which carries the components of the control circuit 50, such as the microcomputer 58. The cover 38 serves to shroud the terminal block 122, along with the other components of the control circuit to prevent access thereto except by an authorized service technician.

Returning to FIG. 4, if the microcomputer determines from the input flow meter data and from the resin bed sensor data that regeneration is required, then the microcomputer outputs a high level logical voltage on the second highest order data bus line (6) terminating at pin $DB_6$. This voltage is supplied to the base of a transistor 124 which is also supplied with a regulated 5 volt d.c. voltage from the power supply via pull up resistance 126. Transistor 124 has its collector-to-emitter portion coupled in series with a resistance 128 between the power supply common terminal and one of the light emitter input terminals $L_2$ of an optical triac 130 whose other light emitter input $L_1$ is coupled to the unregulated voltage output terminal of the power supply. When transistor 124 is rendered conductive by microcomputer 58, the transisor provides a completed circuit path for current to pass in the light emitter of the optical isolator 130 to render the optical isolator conductive. Optical isolator 130, when rendered conductive, provides a completed circuit path between its input terminals $I_1$ and $I_2$, which are supplied with an a.c. voltage, and output terminals $M_1$ and $M_2$, respectively, which are coupled to motor 48. Thus, when transistor 124 is rendered conductive, the motor is energized with a.c. current to drive cam shaft 28 of FIGS. 1–3, thereby initiating resin bed regeneration. To filter the voltage switched by optical triac 130, a resistance 132 is coupled in series with a filter capacitor 134 across terminals $M_1$ and $M_2$ of the optical triac.

As will be recalled, a switch 57 (FIG. 3) is positioned within cavity 33 so that the switch is actuated either upon depression of hub 52 and gear 32 or upon rotation of the gear. Returning to FIG. 4, switch 57 has its contacts connected to collector and emitter of transistor 124, respectively. Thus, when switch 57 is actuated, the switch shorts the collector-to-emitter portion of the transistor to energize the optical triac 130.

In addition to the previously described subcircuitry of the control circuit 50, the control circuit 50 also includes a display comprised of a pair of 7 segment light emitting diode (L.E.D.) displays 134a and 134b for displaying not only the time of day as measured by the number of alternations of the a.c. supply voltage recorded by the internal microprocessor timer, but also for providing an indication of soft water flow from the tank 12. Both of L.E.D.'s display 134a and 134b are coupled to the +5 V and unregulated output voltage terminals of the power supply 59. Each of the seven segments a–g of L.E.D. display 134a is connected via a separate one of pull up resistances 136a through 136g, respectively, to a corresponding one of the outputs 01–07 of a display driver circuit 138 which typically comprises a model 74 LS 47 display driver such as manufactured by Texas Instruments, Dallas, Tex. In addition to being coupled to the +5 V and common terminals of power supply 59 so as to receive a regulated 5 volt d.c. voltage therefrom, display driver circuit 138 has its four input terminals $I_1$–$I_4$ coupled to a separate one of the four highest lines (24–27) of the first port of microcomputer 58 which terminate at microcomputer pins $P_{24}$–$P_{27}$ respectively. During execution of its internally stored program, microcomputer 58 outputs a four-bit binary signal at pins $P_{24}$–$P_{27}$ representing the least significant digit of the hour of the day which is supplied to the display driver 138 which in turn energizes the appropriate segments of L.E.D. display 134a to display this least significant digit of the hour of the day.

To enable control circuit 50 of the present invention to be utilized both domestically and internationally, it is desirable that L.E.D. displays 134a and 134b display the hour of the day either in a 12 hour fashion or a 24 hour fashion. To this end, segments a, d, e, and g of display 134b are each coupled to the common terminal of the power supply through resistance 139 in series with the collector-to-emitter portion of a transistor 140. Transistor 140 is coupled at its base to the power supply +5 V terminal via a pull up resistance 141 and is coupled to the third lowest order line (12) of the first port of the microcomputer terminating at pin $P_{12}$ so as to receive a high logic level voltage therefrom at appropriate intervals during execution of the microcomputer program to energize L.E.D. 134b segments a, d, e and g. Segment b of L.E.D. display 134b is coupled to the power supply common terminal via a resistance 144 in series with the collector-to-emitter portion of a transistor 146. Transistor 146 is supplied at its base with a regulated five volt d.c. voltage from the power supply through a pull up resistance 148 and is also supplied in its base with the logic level output signal appearing on the third lowest line (13) of the first port of the microcomputer which terminates at microcomputer pin $P_{13}$. Segment c of L.E.D. display 134b is suitably connected by the first contactor 150A of a double pull, double throw switch 150 to resistance 144. The second contactor 150b of double pull, double throw switch 150 couples one terminal of a resistance 152, between the decimal point segment d.p. of the L.E.D. display 134b and segment c of light emitting diode 134b. The other terminal of resistance 152 is coupled by the collector-to-emitter portion of a transistor 154 to the power supply common terminal. Transistor 154 is supplied at its base with the five volt regulated d.c. output voltage of the power supply via pullup resistance 155 and is also supplied at its base with the logic level voltage of the second lowest order line (11) of the first microcomputer port terminating at microcomputer pin $P_{11}$.

When switch 150 is set at the "12 Hr" position so that the decimal point segment d.p. of display 134b is coupled to resistance 152 and segment c is coupled in parallel with segment b, then, when transistor 154 is rendered conductive as a result of a microcomputer generating a logic high voltage at pin $P_{11}$, which is the case during the p.m. hours of the day as determined by the internal microcomputer timer, decimal point segment d.p. of light emitting diode display 134b is energized. Once energized, the decimal point segment d.p. illuminates the indicia "PM" on the outer face of window 40 of FIG. 3 to indicate the hourly time displayed by L.E.D. displays 134a and 134b is after noon. With switch 150 in the "12 Hr" position, a "1" is displayed by L.E.D. display 134b when transistor 146 is rendered conductive by the microcomputer. This will occur when the time of day, as determined by the internal microcomputer timer, is between either 10:00 a.m. and 1:00 p.m. or 10:00 p.m. and 1:00 a.m.

If, however, switch 150 is set at the "24 Hr" position so that transistor 154 now drives segment c of L.E.D. display 134b, then, L.E.D. 134b displays a "1" when both transistor 154 and transistors 146 are rendered conductive to energize segments b and c. This will occur when the microcomputer outputs a logical high level voltage at pins $P_{13}$ and $P_{11}$ during the interval when the time of day is between 1000 and 2000 hours. During the interval when the time of day, as determined by the internal microcomputer timer, is between 2000 hours and 0100 hours, then the microcomputer outputs a logic high level voltage at both pins $P_{13}$ and pin $P_{12}$ so that segments a, d, e, and g are energized by transistor 140 and segment b is energized by transistor 146 to display a "2" at display 134b.

L.E.D. display 134a, like display 134b is also provided with a decimal point segment d.p. which is linked via a resistance 158 to the lowest order line (10) of the first microcomputer port terminating at pin $P_{10}$. During intervals other than when regeneration is occurring that is, during intervals when soft water is flowing through resin bed 14 of FIG. 1 and out outlet 23b of FIG. 2, then, microcomputer 58 outputs a logic level voltage at pin $P_{10}$ which alternates between a high and low logic level to alternately energize the decimal point segment d.p. of L.E.D. display 134a. Decimal point segment d.p. of display 134b appears behind the indicia "WATER FLOW" on window 40 of FIG. 3 so that while water is flowing through the softener, the decimal point segment d.p. of L.E.D. 134a flashes.

In addition to light emitting diode displays 134a and 134b, control circuit 50 advantageously includes an additional light emitting diode 175 coupled between the common terminal of the power supply and the emitter of a transistor 176. Transistor 176 is coupled at its collector through a dropping resistor 177 to the +5 volt supply whereas the transistor base is coupled to the microcomputer pin $P_{16}$. As will become better understood by reference to the description of the program stored within the microcomputer, if, following initiation and completion of a regeneration cycle, the resin bed 14 remains depleted (as determined by sensor 49 of FIG. 1), then, the microcomputer 58 generates a logic high level signal at pin $P_{16}$ to render transistor 176 conductive. When transistor 176 becomes conductive, light emitting diode 175, which is mounted behind window 42 opposite the indicia "NO REGEN", is energized. Once energized, the light emitting diode 175 serves to illuminate the indicia "NO REGEN" to signify that even though regeneration was initiated, the resin bed remains depleted because of mechanical fault or lack of regenerant.

As indicated previously, within the internal memory of microcomputer 58 of FIG. 4 is a program which controls the microcomputer to enable the microcomputer to process the incoming data to determine whether or not motor 48 of FIGS. 2 and 3 should be energized to initiate regeneration as well as to enable the microcomputer to display the time of day on L.E.D. displays 134a and 134b of FIG. 4.

PROGRAM START UP—STEPS 200-206

Figure 5A:
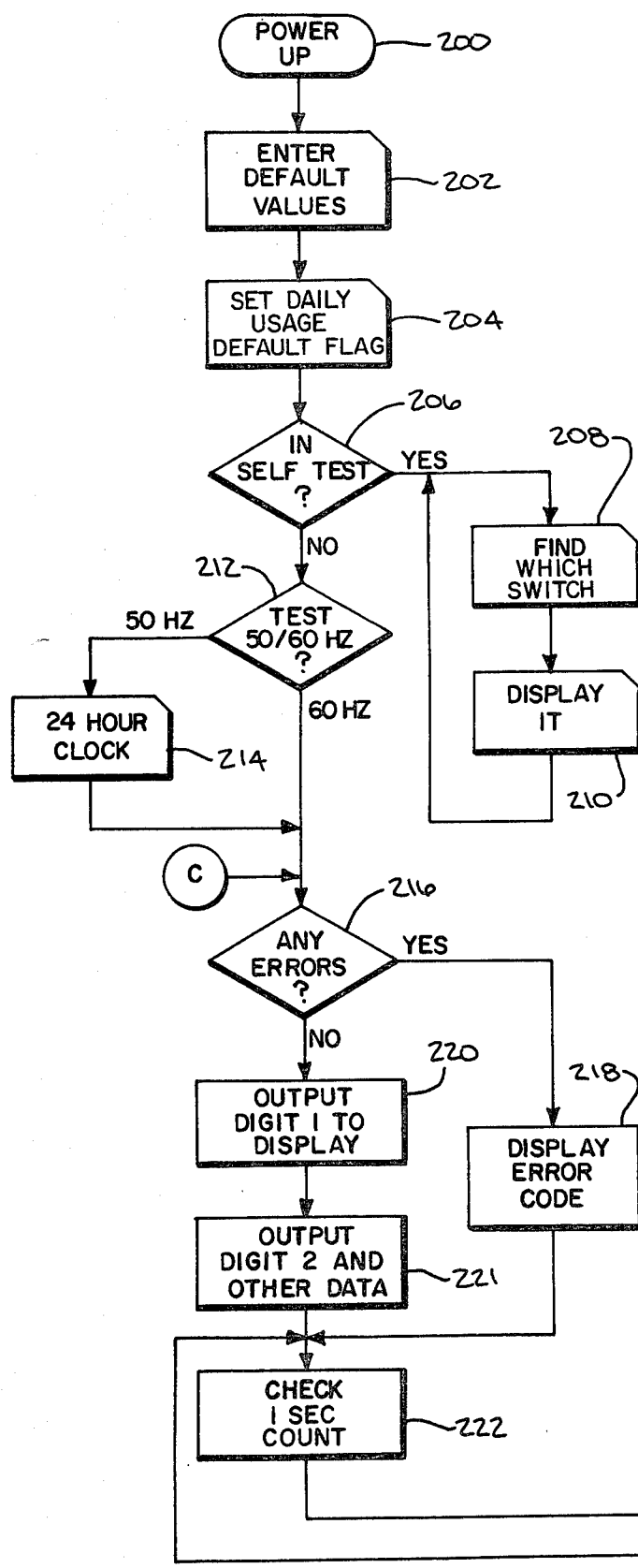
FIGS. 5A through 5D illustrate, in flow chart form, the program executed by the water softener control of the present invention during operation.
Figure 5A:
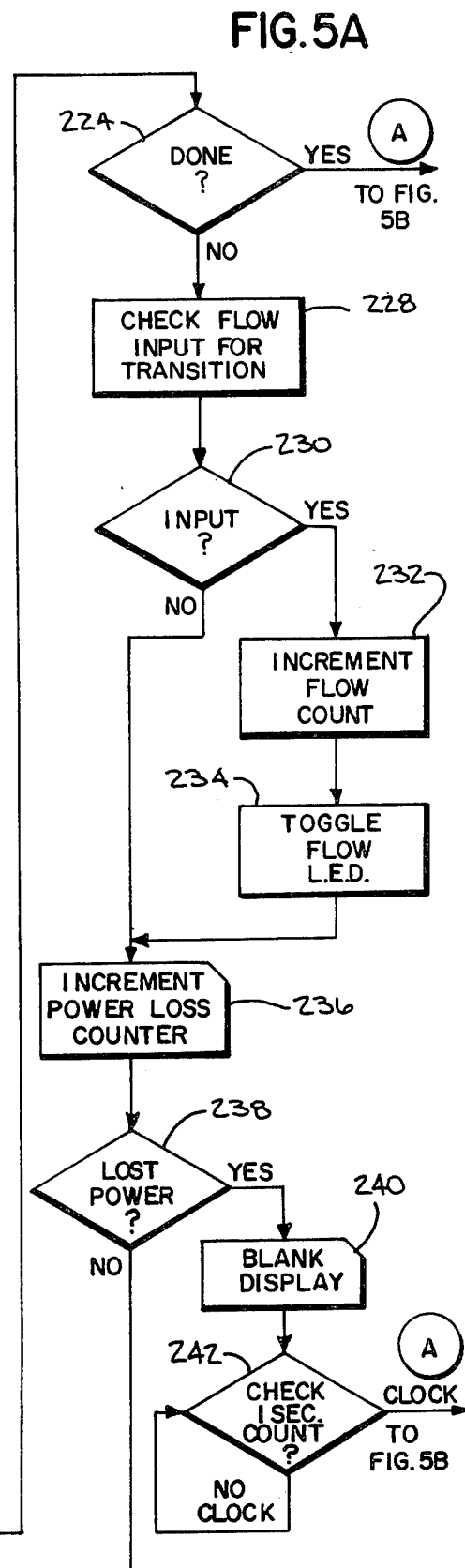

Referring now to FIGS. 5A through 5D which illustrate in flow chart form the program executed by the mirocomputer and in particular FIG. 5A, execution of the microcomputer program is commenced (Step 200) when power is applied to the microcomputer. Following program startup, a default value for the time of day is entered into the register of the internal microcomputer timer for time keeping purposes (Step 202). Typically, this default value is "12 noon." However, the default value can be incremented when switch 79 of control circuit 50 is actuated so that if the correct hour of the day is other than 12 noon, then the appropriate value can be entered into the timer register. Following entry of the default value into the timer register, an internal microcomputer flag, designated as the "daily usage default" flag is set to indicate that actual values of the daily water usage and the resin bed capacity are not yet available. Since the microcomputer of the present invention operates to initiate water softener regeneration when the actual treating capacity of resin bed 14 of FIG. 1 is less than a reserve quantity calculated in accordance with the actual average daily soft water consumption, the entry of finite artificial values for the daily amount of soft water consumed in place of the value zero (0) stored in memory enables the microcomputer to better regulate the frequency of water softener regeneration during the first week of operation. Each of the seven artificial values representing the daily consumption of soft water used for a particular day of the week is initially entered during latter execution of the program (as hereinafter described). However, once an operational cycle has been completed, these values are replaced with the actual value of the daily consumption of soft water as determined from the flow meter during later operation of the water softener control.

In my previous water softener control described and claimed in U.S. patent application Ser. No. 412,279, the capacity value was entered by jumpering one or more of the microcomputer port pins to a corresponding data plus pin. However, no such provisions are made in the present water softener control for inputting the capacity so that an alternate method must be available for entering default values to enable a first determination of the capacity of the sensor.

SELF TEST MODE STEPS 206-210

Following setting of the daily default usage flag to indicate daily usage values representing the amount of soft water used for each of the seven days of a week are required (Step 204), the microcomputer 58 then checks whether it is operating in a self test mode (Step 206). During installation as well as during intervals when the operation of microcomputer 58 is to be evaluated, the microcomputer is placed in a self test mode by jumpering certain of the microcomputer data bus pins $DB_0$–$DB_5$ and port pins $P_{20}$–$P_{23}$ to pin $P_{14}$. If the microcomputer is operating in the self test mode, then the microcomputer checks to see which of any of the switches connected thereto, such as switch 150, have been actuated (Step 208). Should a particular switch be actuated, then a particular code representing the switch is displayed (Step 210).

DISPLAY OF TIME OF DAY—STEPS 212–221

Once the microcomputer 58 has determined that it is not operating in the self test mode, the microcomputer examines the conduction state of switch 81 to determine whether or not the incoming a.c. supply to the primary of transformer 60 is at 50 or 60 hertz (Step 212). The frequency of the a.c. supply voltage is important since the internal timer of microcomputer 58 is clocked in response to the alternations of the a.c. power supply voltage. If frequency of the a.c. input voltage is 50 hertz, then, microcomputer 58 operates light emitting diode displays 134a and 134b (FIG. 4) as a 24 hour clock (Step 214), assuming that switch 150 has been set to the "24 hour" position. In a location where the frequency of the a.c. supply voltage is 50 hertz, time is usually measured in 24 hour fashion rather than a 12 hour fashion. Following either a determination that the a.c. supply voltage is 60 hertz, or following the operation of the L.E.D. 134a and 134b (FIG. 4) in a 24 hour clock mode, microcomputer 58 checks to see whether or not there are any errors (Step 216). Detection of an error results in a code indicative of the error being displayed on L.E.D.'s displays 134a and 134b (Step 218). Otherwise, if no errors are detected, then the microcomputer causes L.E.D. 134b to display the least significant digit of the hour of the day (Step 220) and causes L.E.D. display 134a to display the most significant hour of the day (Step 221).

TIME KEEPING AND FLOW DETECTION—STEPS 222–234

Figure 5B:
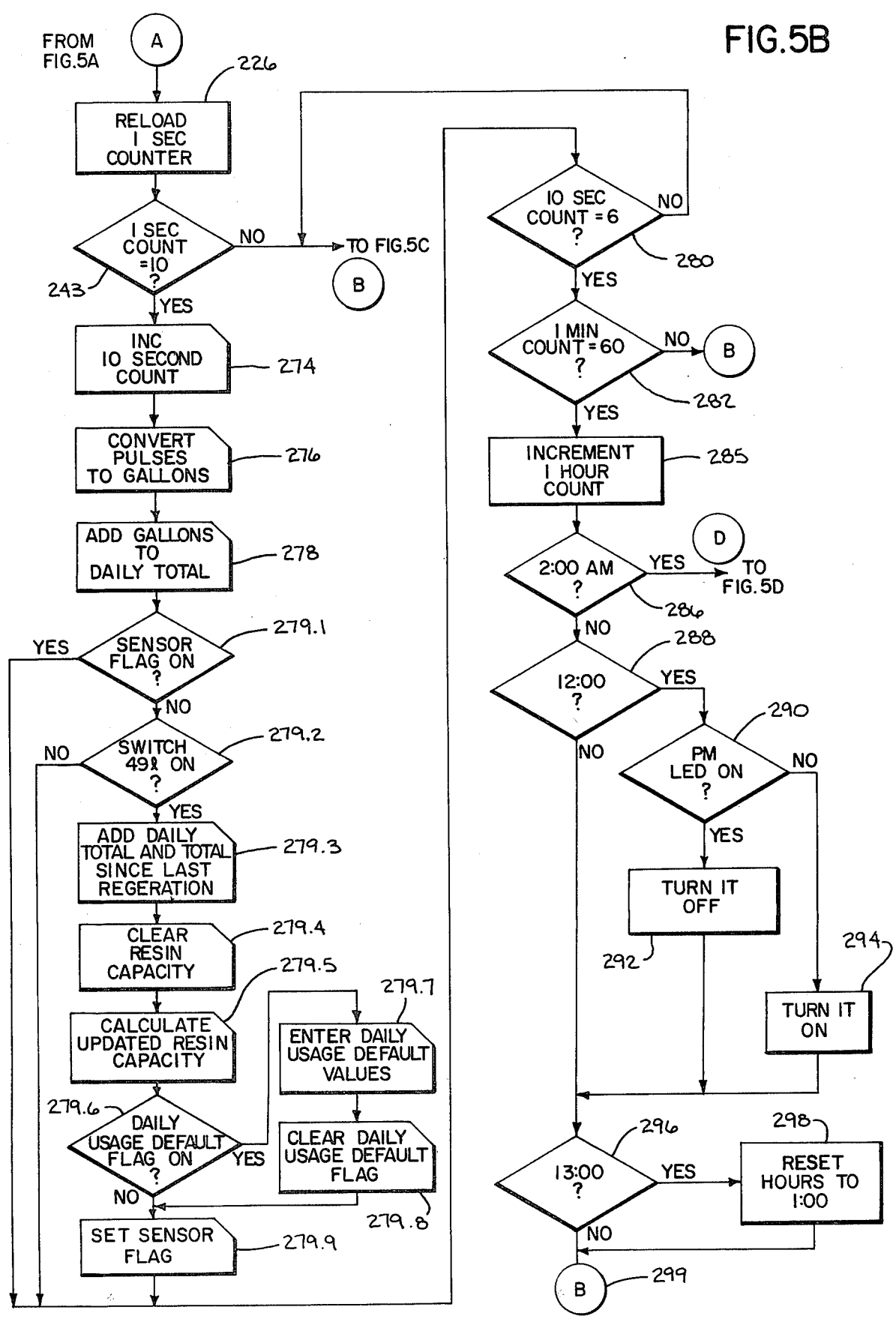

After displaying either the time of day, assuming that no errors exist, or after displaying the error code, the microcomputer then checks the one second count recorded by the internal microcomputer timer (Step 222). When the microcomputer has completed this task (Step 224), that is to say that the lapse of one second has been recorded by the one second register then, the microcomputer branches to program block A and reloads the one second register (Step 226) as indicated in FIG. 5B. Otherwise, while the microcomputer is waiting for one second to elapse, the microcomputer checks the flow meter (Step 228) by inputting the logic level output voltage of the flow meter. The output logic level voltage of the flow meter is compared to a reference level stored in memory (Step 230). A determination that the logic level voltage produced by the flow meter equals the stored reference value is indicative of the passage of water through the flow meter. In response, an internal microcomputer counter storing a count representative of a passage of a certain quantity of water through the flow meter during a given interval is incremented (Step 232) and thereafter, the decimal point segment d.p. of light emitting diode display 134a (FIG. 4) is energized or toggled (Step 234) to indicate water flow through the softener.

POWER LOSS DETECTION—STEPS 236–242

Following a determination that the output logic level voltage of the flow meter has not changed states, or following toggling of the L.E.D. display decimal point segment, an internal microcomputer register designated as a "power loss" counter is incremented (Step 236). This register is referred to as a power loss counter because its count continues to be incremented during the period while the microcomputer is awaiting its internal timer to record the lapse of one second. Failure of the power loss counter to be incremented indicates failure of the internal microcomputer timer to record the passage of one second, thus indicating a loss of a.c. power. By checking the count of the power loss counter, (Step 238) a power loss can be detected. If the count of the power loss counter has not been incremented, as determined during Step 238, a powre failure has occurred and the microcomputer than blanks the display of light emitting diodes 134a and 134b of FIG. 4 (Step 240) to conserve on power.

After the display has been blanked, the microcomputer checks whether the internal microcomputer timer has resumed counting (Step 242) and continues to check until the internal microcomputer timer records the passage of one second as will normally occur once power is reapplied to the microcomputer. Upon a determination that one second has elapsed, the microcomputer branches to program block A (FIG. 5B) and the one second register is reloaded (Step 226). However, after checking the power loss counter (Step 238), if no power loss has been detected, then the microcomputer branches to step 222 to recheck the one second register to determine whether or not one second has elapsed.

TIME SETTING—STEPS 244–265

Figure 5C:
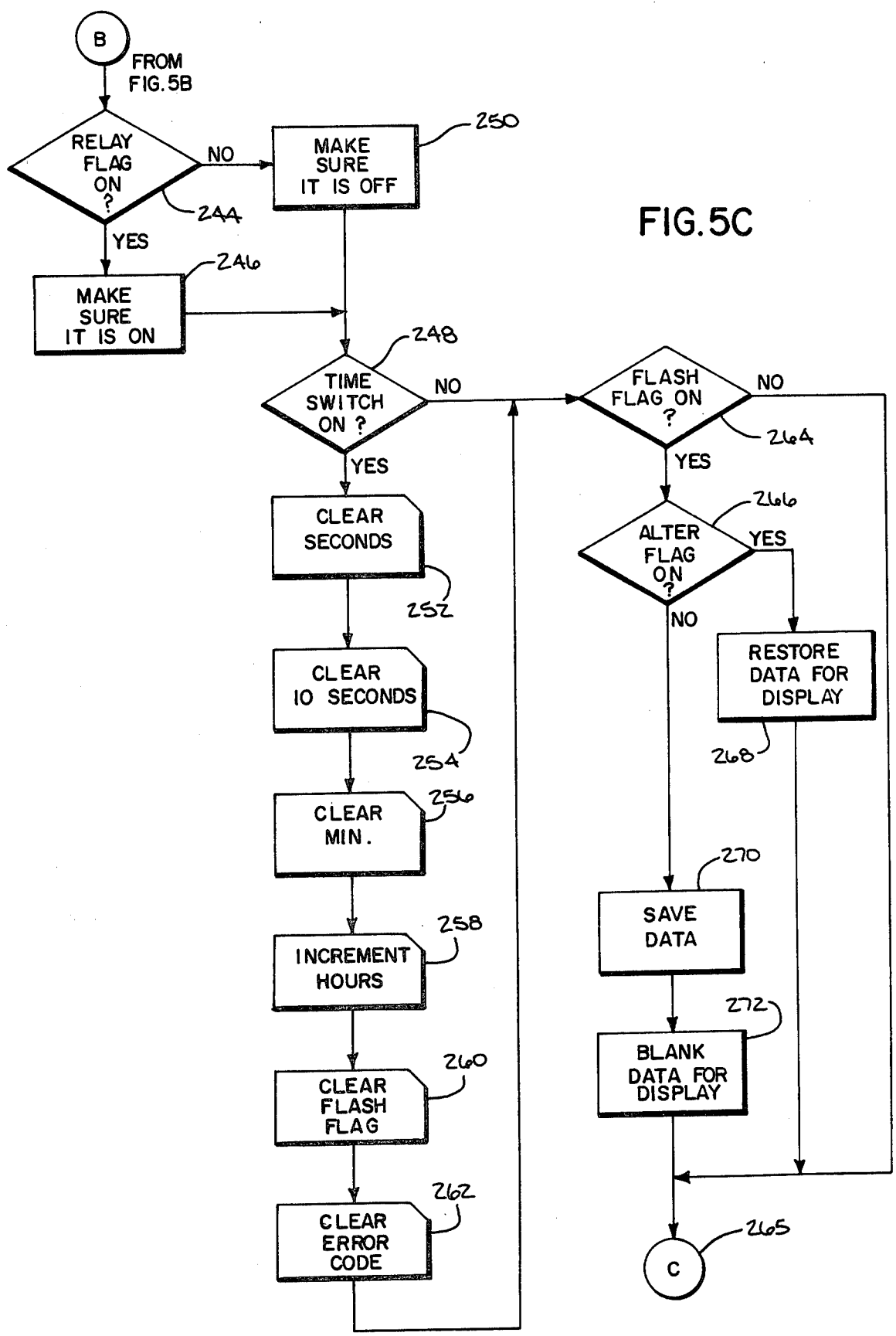

Referring to FIG. 5B, following completion of checking the one second register (Step 224) and reloading of the register (Step 226), the microcomputer determines whether or not the internal microcomputer timer ten second register has counted out the passage of ten seconds (Step 243) after the one second register has been reloaded. If ten seconds have not elapsed, the microcomputer branches to block B and determines whether or not the relay flag has been set (Step 244) as illustrated in FIG. 5C. As will become better understood by reference to the remaining steps of the program, once the microcomputer determines that regeneration should occur, microcomputer 58 sets a relay flag causing a high logic voltage to appear at microcomputer data bus pin $DB_7$ in response to which, transistor 124 of FIG. 4 is rendered conductive to energize the optical triac 130 of FIG. 4. The optical triac then energizes motor 48 (FIG. 2) to drive cam shaft 28 (FIGS. 1 and 2) to initiate regeneration. After regeneration is initiated by setting of the relay flag, the relay flag remains set for ten minutes to assure that the optical triac keeps motor 48 of FIG. 2 energized. Once the motor has been energized to drive the camshaft 28 of FIGS. 1 and 2 via gears 46, 44 and 32, the switch 57 is kept closed by the rotation of the gears to keep the motor energized well after the 10 minutes has elapsed so that the entire regeneration cycle, which usually takes between 1–2 hours will be completed.

Returning to FIG. 5C, if the relay flag has been set, or is "on" the microcomputer makes sure that the relay flag has been set (Step 246) before determining whether or not switch 79 of FIG. 4 has been closed (Step 248) to set the time displayed by light emitting diodes 134a and 134b of FIG. 4. Alternatively, the microcomputer makes sure that after having not detected a set relay flag, that no flag was in fact set (Step 250) before checking to see whether switch 79 is closed to alter the displayed time (Step 248).

Following the determination that switch 79 has been closed to set the time display by the light emitting diodes 134a and 134b of FIG. 4, the microcomputer then clears the internal microcomputer timer one second register recording the number of elapsed seconds (Step 252). Thereafter the microcomputer then clears the timer ten second register recording the number of ten second intervals that have elapsed (Step 254). Next, the microcomputer clears the register recording the number of 60 second or one minute intervals that have elapsed (Step 256) before the microcomputer increments the register of the internal microcomputer timer which records the passage of hours (Step 258).

Upon incrementation of the hour-register of the internal microcomputer timer, a "flash" flag is reset (Step 260) before clearing the register storing the error codes (Step 262). The purpose of the flash flag will be explained below. After, either the microcomputer has cleared the error code register (Step 262) or after the computer has determined that the time switch 79 of FIG. 4 has not been closed (Step 248), the microcomputer determines whether the flash flag has been set (Step 264).

During execution of the presently described program, an internal flag within the microcomputer referred to as the "flash flag" is alternately set and reset every second. As will become clear immediately hereinafter, the alternation of the state of the flash flag causes the display of light emitting diodes 134a and 134b to flash on and off during alternate seconds. A determination that the flash flag was unset when checked during Step 264, causes the microcomputer 58 to execute a jump instruction (Step 265) to branch to program block C so that Step 216 is re-executed after which either the appropriate error code is displayed (Step 218) or if no error exists, then the time of day is displayed on LED 134a and 134b of FIG. 4 (Steps 220 and 221). However a determination that the flash flag is set causes the microcomputer 58 to check to see whether another flag, referred to as the "alter flag", has been set (Step 266). This flag is set each time the time of day data to be displayed by the light emitting diodes has been altered or changed as will occur when the hour of the day has changed. When the alter flag has been set, then the altered time of day data to be displayed is stored in microcomputer memory in place of the previous time of day data (Step 268) and jump Step 265 is then executed so that program control branches to step 216. If the alter flag has not been set, then the time of day data is stored (Step 270) in a section of memory other than that associated with the data to be displayed on the light emitting diode display and data representing a blank display is moved into the memory location where the time of day data to be displayed is usually stored (Step 272) before jump step 265 is executed. When data representing a blank is stored in this memory location of the microcomputer memory, and when steps 220 and 221 are executed, neither of light emitting diode displays 134a and 134b are energized, so as to effectively display a blank.

WATER FLOW CALCULATION—STEPS 274–278

Returning now to FIG. 5B, when the internal microcomputer timer has in fact counted ten seconds, then the program branches to Step 274 after the ten second register has counted out rather than to Step 244 as was described previously. Upon execution of Step 274, the microcomputer increments the ten second register. Following incrementation of the ten second register, the previously stored count representing the number of transitions of the logic level of the flowmeter output voltage is converted into gallons (Step 276). This is accomplished by multiplying the flowmeter output voltage transition count by a constant. The constant is actually a conversion factor which equals the number of gallons flowing past the flowmeter during the interval between each transition of the flowmeter output voltage. The calculated amount of soft water that left the softener during this 10 second interval is added to the previously calculated daily volume of soft water already stored in memory (Step 278) to keep an ongoing record of the amount of soft water passing through the softener for that day.

RESIN BED CAPACITY CALCULATION AND DEFAULT VALUE ENTRY, STEPS 279.1–279.9

Immediately following execution of step 278, the microcomputer then checks to see whether or not a "sensor" flag internal to the microcomputer has been set (Step 279.1). As will be explained hereinafter, the sensor flag is set each time that the resin bed capacity is updated. Thus, the status of the resin bed sensor flag indicates whether or not the microcomputer should proceed further with regard to updating the resin bed capacity. If the sensor flag has not been set, then the microcomputer checks to see whether or not switch 49l is non-conductive (Step 279.2). As will be recalled, the switch 49l remains non-conductive for so long as the water at the half-level of the resin bed 14 of FIG. 1 is soft. A determination that the switch is no longer non-conductive thus signifies that the resin bed capacity has been depleted to 50% of its original capacity. Should switch 49l be found conductive during execution of Step 279.2, then the microcomputer proceeds to add the daily total soft water consumption to the total value of the soft water consumed since the last regeneration (Step 279.3) to determine the total amount of soft water consumption which resulted in depletion of the resin bed 14 to 50% of its original refining capacity.

Thereafter, the previous value in memory representing the resin bed capacity is cleared (Step 279.4) and then the microcomputer proceeds to calculate an updated resin capacity value (Step 279.5). The microcomputer accomplishes such a calculation by simply doubling the total soft water consumption value calculated in Step 279.3. Since the soft water consumption calculated during Step 279.3 caused a depletion of 50% of the resin bed refining capacity, it is logical to assume that consumption of twice as much soft water will result in complete depletion of the resin bed.

The total treating capacity ($Q_T$) of the resin bed can be expressed mathematically as $$Q_T = Q_C/P \qquad (1).$$

Where $Q_C$ is the quantity of soft water consumed since the previous regeneration and P is the percentage depletion (expressed as a decimal) of the resin bed as sensed by sensor 49.

Thereafter, the microcomputer 58 checks to see whether or not the "daily usage" default flag has been set as occurs during Step 204 following an initial "power-up" (Step 200). A determination that the daily usage default flag was set causes the microcomputer to enter the daily usage default values into memory (Step 279.7) since actual usage values are not available because the microcomputer has not yet been operational for a sufficient period of time to enable their calculations. Typically each of the seven memory locations storing the daily total soft water consumption is filled with ¼ of the value calculated in Step 278. Following entry of the daily default usage values, the daily usage default flag is cleared (Step 279.8) following which, the sensor flag is set (Step 279.9) to indicate updating of the capacity value. If at the time the daily usage default flag is checked (Step 279.6), the flag has not been set, then the microcomputer proceeds directly to set the sensor flag (279.9).

TIME UPDATE STEPS 280–298

Following setting of the sensor flag (Step 279.9) or following a determination that the sensor flag had been set (279.1) or that the switch 49*l* was on (Step 279.2), then the microcomputer proceeds to check whether or not the 10 second register, which counts the passage of 10 second increments, has counted out six times, thus indicating the passage of a minute (Step 280). If the ten second timer has not counted out six times, then the microcomputer jumps to program block B to re-execute Step 244 and those following it described previously to make sure that the relay flag is set or not set and then to cause the time of day to be flashed on the L.E.D.'s 134*a* and 134*b* of FIG. 4.

When, however, the ten second register of the internal microcomputer timer has in fact counted out six times indicating the passage of a minute, then the microcomputer checks the 60 minute register to determine whether or not the number of minutes that have been counted equals sixty (Step 282) indicating the passage of an hour. The microcomputer will execute a jump instruction (Step 283) to branch to block B of the program if an hour has not elapsed so that the microcomputer commences re-execution of Step 244. Otherwise, if the number of minutes counted does equal sixty, then the hour register which counts the number of hours that have elapsed is incremented by one (Step 285).

Following incrementation of the hour register the microcomputer then determines whether or not the particular time of day as determined by the count of the hour counter is 2:00 a.m. (Step 286) so that the microcomputer can determine whether or not regeneration should occur at this time of day when treated water use is unlikely in a household. Should the time not be 2:00 a.m., then the microcomputer checks the count of the hour register to determine whether or not the count of the hour register is twelve which would indicate a time of either 12:00 noon or 12:00 midnight (step 288). Upon a determination that the count of the hour counter was 12, the microcomputer then checks whether or not the decimal point segment d.p. of light emitting diode 134*a* of FIG. 4 was previously energized (Step 290). If, at the time the count of the hour register equals 12 the microcomputer has determined that the decimal point segment d.p. of L.E.D. 134*a* of FIG. 4 was previously on, indicating that the time of day was after 11:00 p.m. but before 12:00 midnight, then the decimal point segment d.p. is turned off (Step 292) indicating that the time is now after midnight and before noon. However, if the decimal point segment d.p. of the light emitting diode 134*a* had previously been off or de-energized before the count of the hour register reached twelve, then after the hour counter has counted twelve, the decimal point segment d.p. of light emitting diode display 134*a* is turned on (Step 294) to indicate that the time is now post meridian rather than antimeridian.

When the microcomputer has determined that the hour register has not counted twelve during Step 288, then, the hour register is checked to determine whether or not the number of hours counted equals thirteen (Step 296). A count of 13 requires that the number of hours counted by the hour register be reset to one (Step 298) before the program executes jump instruction 299 to branch to to program block B to re-execute Step 244. Otherwise if the count of the hour register is other than thirteen, then the program executes jump instruction 299 to branch to Step 244 directly without resetting of the hours register.

DECIDE IF REGENERATION IS REQUIRED—STEPS 286–328

Figure 5D:
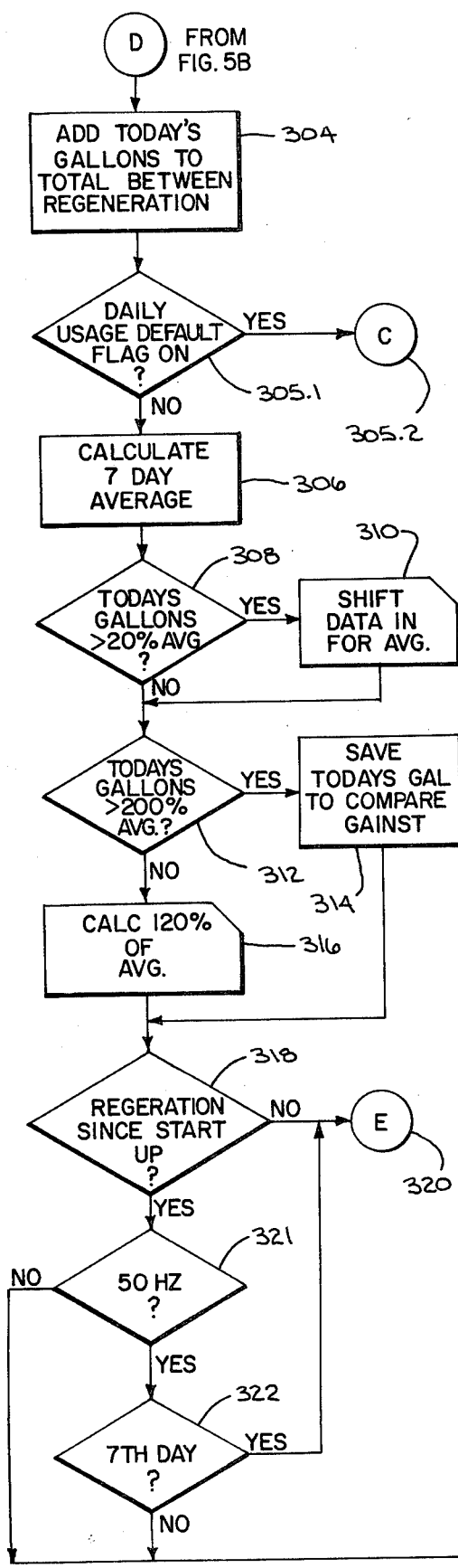
Figure 5D:
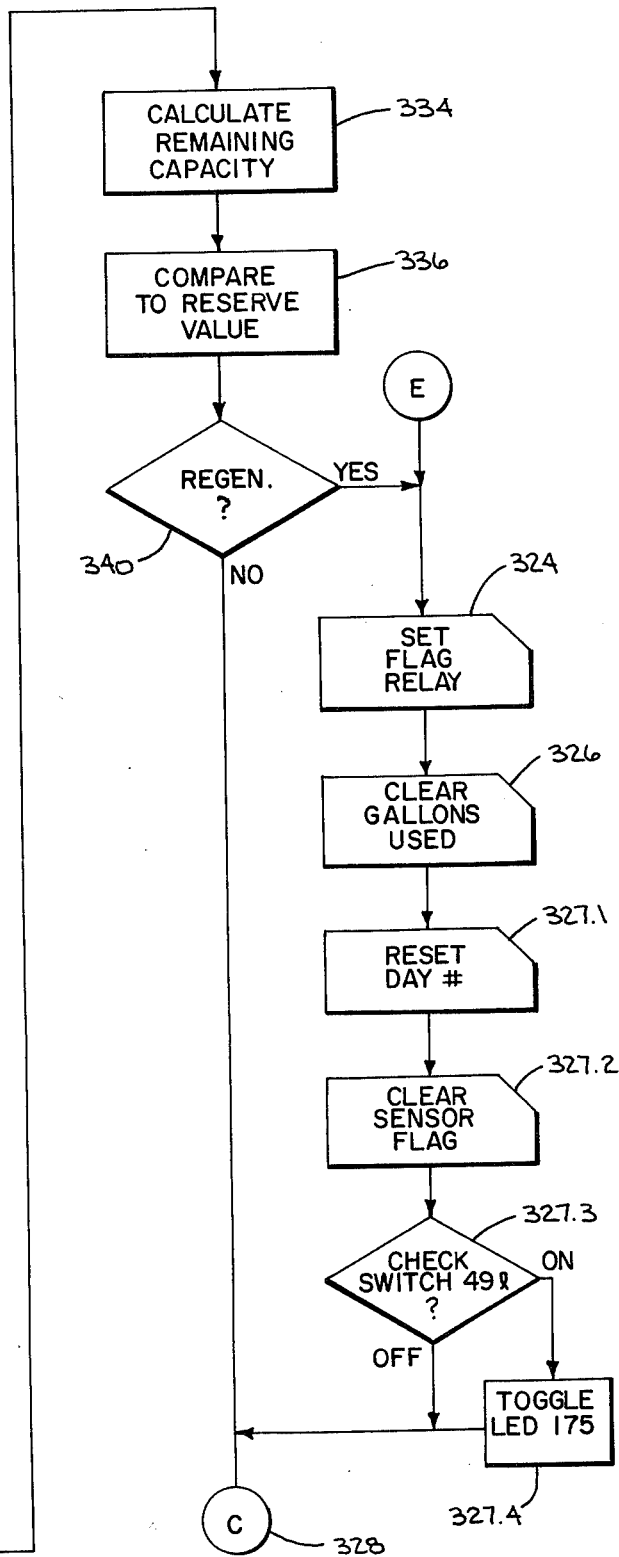

Should the microcomputer determine during execution of step 286 that the time of day is 2:00 a.m. or such other offhour time as designated for regeneration, then the microcomputer proceeds to determine whether or not regeneration should occur by branching to block D and executing the following steps illustrated in flow chart form in FIG. 5D. First, the total number of gallons used during the just elapsed 24 hour period, as determined during execution of Steps 274–278, are added to the total number of gallons used since previous regeneration (Step 304). Next, the status daily usage default flag is checked (Step 305.1). Should the daily usage default flag be set, before setting of the sensor flag, as occurs during the interval time between initial "power-up" and depletion of the resin bed to 50% of its original capacity, then the microcomputer executes a jump instruction (Step 305.2) to branch control to program block C and to commence execution of Step 216. In this way, the microcomputer delays regeneration for another 24 hours following initial "power-up" if the resin bed has not yet been depleted to 50% of its original refining capacity to maximize the control efficiency. In addition, by branching to Step 216 if the daily usage default flag is set, the microcomputer is prevented from calculating any reserve value before the default capacity value is entered in memory during Step 279.7. Otherwise, the microcomputer might calculate the capacity where only zero values are contained in its memory so as to yield an erroneous result.

Upon determination that the default flag is not set indicating that at least 50% of the resin bed capacity has been depleted, then the microcomputer proceeds to determine whether or not regeneration is to occur. As indicated previously, the decision to initiate regeneration results from a determination that the anticipated soft water demand is greater than the remaining resin bed capacity. In order to determine the anticipated soft water demand, the microcomputer first calculates the average daily amount of soft water consumed over the past seven days (excluding the just elapsed day) by summing the seven separate values representing the daily soft water consumption for that day and dividing the total sum by seven (Step 306). Once the average of the daily consumption of soft water is calculated, this average value is compared to the previous day's total consumption (Step 308). If the previous day's consumption is greater than 20% or any other small portion of the average daily consumption, then the previous day's usage is stored in memory as the amount of water consumed for that day causing each of the daily stored values of the water consumption to be shifted in memory to now represent one earlier days usage (Step 310) before proceeding to the next step. Note that the earliest day's usage will be erased. However, when the previous day's usage is less than 20% of the average daily consumption it is added to the total amount of water used between regenerations but it is not stored in memory as the amount of soft water consumed during that day so that no data shifting occurs. In this way, an unusually low daily consumption of soft water is ignored to avoid a zero average daily consumption of soft water such as might occur during intervals of non-usage such as during vacations.

Following execution of Step 310, or following execution of Step 308 if the consumption for a given day is less than 20% of the average daily consumption, the microcomputer then checks whether or not the previous day's consumption was greater than 200% of the average daily consumption (Step 312). Should the previous day's consumption of soft water be greater than 200% of the seven day's average consumption of soft water due to a sudden increase in water consumption which may result from the arrival of weekend guests for example, then this previous day's usage is stored in memory as a reserve value (Step 314). This reserve value represents the total amount of soft water likely to be consumed during the next 24 hour interval before the microcomputer will again make a determination as to whether or not regeneration is necessary. Otherwise the reserve value is determined as a percentage of the calculated seven day average (Step 316). Typically, if the previous day's consumption is less than 200% of the calculated average, the reserve calculated during Step 312 is obtained by multiplying the seven day average by 1.2.

After the reserve is established, either during execution of Step 314 or Step 316, depending whether the previous day's consumption was greater than or less than 200% of the calculated seven day average, respectively, then the microcomputer checks whether a regeneration has occurred following start-up after a power failure (Step 318). If no regeneration has occurred following start-up after a power failure, then the microcomputer initiates regeneration by executing jump instruction 320 to branch to program block E and Step 324. Step 324, when executed, causes the microcomputer to set the previously described relay flag which results in the energization of motor 48 of FIGS. 1 and 2 to initiate regeneration of the water softener. In this way regeneration always occurs after a power failure but not until the resin bed capacity is 50% depleted to assure that soft water always leaves the softener which may not otherwise occur if a large quantity of soft water is consumed during the power failure. After the relay flag has been set, then the memory location within the internal microcomputer memory storing the data representing the number of gallons used since the previous regeneration is cleared (Step 326). Once this memory location has been cleared, the internal microcomputer register which keeps track of the number of days between regeneration intervals is reset (Step 327.1).

Following resetting of the internal microcomputer register recording the elapsed days between regenerations, the sensor flag is cleared (Step 327.2) to facilitate subsequent calculation of the total resin bed capacity upon execution of Steps 279.1–279.9 during the next operational cycle. Thereafter, the status of switch 49*l* is checked (Step 327.3). Normally, switch 49*l* should become non-conductive after regeneration since the water in communication with the special resin 49*c* within the sensor 49 of FIGS. 3A and 3B should be soft. Thus, a determination that switch 49*l* is non-conductive represents the normal state of affairs following regenerations so that if the microcomputer finds the switch 49*l* to be off, the microcomputer executes Step 328 to branch to program block C. In practice, the status of the switch is checked at the end of the regeneration cycle.

Should the conduction state of switch 49*l* be on when checked during execution of Step 327.3, then, the microcomputer outputs a logic high level signal at pin 16 (FIG. 4) to toggle light emitting diode 175 (Step 327.4) to signal that no regeneration was effected notwithstanding the fact that a regeneration cycle was initiated, thereby alerting the user to take the appropriate steps (such as adding regenerant, or having the unit repaired to assure proper operation). After light emitting diode 175 is turned on, the microcomputer then executes a jump instruction (Step 328) to branch to program block C.

If, however, a regeneration has occured since start-up of the microcomputer following a power failure, then jump instruction 320 is not executed but rather the microcomputer branches to Step 321 during which step the microcomputer checks to see whether the frequency of the incoming power is 50 $H_z$. If the frequency is 50 $H_z$, then the microcomputer checks to see whether 7 or any other predetermined number of days have elapsed since the last regeneration (Step 322). Should the count of a register recording the number of days since regeneration be 7 or greater, indicating that 7 or more days have elapsed since the previous regeneration, then the microcomputer will execute jump instruction 320 to branch control to program block E and Step 324 which, when executed initiates water softener regeneration. In this way, regeneration is automatically effected every 7 days if no previous regenerations have occurred as is sometimes required by the health laws of countries foreign to the U.S.

When the microcomputer has determined that the power frequency is not 50 $H_z$ or if the power frequency is 50 $H_z$ and 7 days have not elapsed since the previous regeneration, then, the microcomputer proceeds to determine the remaining refining capacity of the resin bed 14 (Step 334). The remaining treating capacity of resin bed 14 is determined by the microcomputer as follows. If $Q_T$ is the total treating capacity of the resin bed as determined in Step 279.5, and $Q_C$ is the quantity of water consumed thus far which represents the amount of treating capacity depleted thus far as determined in Step 304, then $Q_R$ the remaining capacity is given by the formula $$Q_T - Q_C = Q_R \tag{2}$$

Typically the units for these capacities are in gallons.

The value representing the remaining water softener capacity is then compared to the reserve value (Step 336) previously calculated either during Step 314 or Step 316. Following comparison of the reserve value to the calculated value representing the remaining water softener resin bed treating capacity, the microcomputer then determines whether or not regeneration should occur (Step 340). If the reserve value as previously calculated during either Step 314 or Step 316 is greater than the remaining water softener resin bed capacity so that it is highly improbable that the water softener would be able to treat that amount of soft water likely to be consumed during the next 24 hour interval, then regeneration is effected by branching to Step 324 to cause the relay flag to be set and motor 48 of FIGS. 1 and 2 to be energized. Otherwise, when the remaining water softener capacity calculated during step 334 is greater than the reserve calculated during either of steps 314 or 316, then no regeneration need be effected. Upon this event, the microcomputer executes jump instruction 328 to branch to program block C and Step 216. Following execution of Step 216, the microcomputer then executes an appropriate sequence of Steps 220–265 in the manner described previously.

Execution of the above-described program occurs continuously during operation of the water softener without any need for manual intervention. The entire operation is automatic since data regarding soft water consumption and the refining bed capacity is supplied as required by the flowmeter 110 and the resin bed sensor 49. Even a power outage will not totally prevent execution of the internal microcomputer program controlling the water softener although it is necessary for power to be resumed in order for the control circuit 50 to effectively control water softener regeneration.

Although the control circuit of the present invention has been described for use with a resin bed water softener, it is equally useful for controlling other types of water treatment devices having a filter bed requiring periodic regeneration.

The foregoing describes an improved control circuit for a water softener for controlling regeneration of a water softener resin bed in accordance with the actual average daily consumption and the resin bed refining capacity so as to prevent the water softener from regenerating too often or not often enough.

While only certain preferred features of the invention have been shown by way of illustration, many modifications and changes will occur to those skilled in the art. It is, therefore, to be understood that the appended claims are intended to cover all such modifications and changes as will fall within the true spirit of the invention.

What is claimed is:

1. A control for a water treatment device having a particle bed requiring periodic regeneration comprising:
    a flowmeter for detecting the quantity of treated water leaving the water treatment device;
    a particle bed sensor for sensing when the treating capacity of the particle bed has been depleted to a predetermined percentage of the total particle bed treating capacity; and
    a controller coupled to said flowmeter for determining the total quantity of treated water leaving the water treatment device and for determining the actual average of the daily consumption of treated water and establishing a treated water reserve in accordance with said actual average daily consumption of treated water, said controller coupled to said particle bed sensor for determining the particle bed treating capacity when said sensor has sensed that the particle bed treating capacity has been depleted to said predetermined percentage and said controller initiating regeneration of the water treatment device particle bed at a predetermined time of day if the remaining particle bed treating capacity is less than said established treated water reserve.

2. The invention according to claim 1 wherein said controller includes:
    a microcomputer having
       an internal timer for recording the passage of time;
       an internal memory for storing data from said flowmeter indicative of the amount of treated water leaving the water treatment device over a given period of time; and
    a central processing unit programmed to calculate, each day, the total quantity of treated water consumed ($Q_C$) since the previous particle bed regeneration, and to calculate, from the total quantity of treated water consumed, the actual average of daily consumption of treated water, and to establish a treated water reserve, from said actual average daily treated water consumption, said central processing unit coupled to said particle bed sensor, and in response to a signal therefrom indicating depletion of said particle bed to said predetermined percentage (P), expressed as a decimal, of the total particle bed treating capacity, said central processing unit determining the total particle bed treating capacity ($Q_T$) in accordance with the ratio of the quantity of treated water consumed ($Q_C$) to the predetermined percentage (P) of depletion, said central processing unit initiating regeneration of said particle bed at said prescribed time each day when said remaining particle bed treating capacity ($Q_R$) determined in accordance with the difference between the total particle bed treating capacity ($Q_T$) and the quantity of water consumed ($Q_C$) is less than said established treated water reserve.

3. A method of controlling a water treatment device having a particle bed requiring a regeneration comprising the steps of:
    (a) measuring the quantity of treated water leaving the water treatment device for a given period of time;
    (b) determining the total quantity ($Q_C$) of treated water consumed since the previous regeneration in accordance with the measured quantity of treated water leaving said water treatment device;
    (c) determining the actual average of daily consumption of treated water in accordance with said measured quantity of treated water leaving the water treatment device;
    (d) establishing a reserve quantity of treated water as a proportion of the actual average daily quantity of soft water consumed;
    (e) determining if the particle bed water treating capacity has been depleted to a predetermined percentage (P) of the total water treatment device treating capacity and if so, calculating the total particle bed treating capacity ($Q_T$) as a proportion of the total quantity of treated water consumed since the previous regeneration;
    (f) calculating the remaining particle bed treating capacity ($Q_R$) from the total resin bed capacity ($Q_T$) and quantity of treated water consumed since the previous regeneration ($Q_C$); and
    (g) initiating regeneration of the particle bed if the remaining particle bed treating capacity is less than said established treated water reserve.

4. The method according to claim 3 wherein the total water treatment particle bed treating capacity ($Q_T$) is determined in accordance with the ratio of the quantity of water consumed ($Q_C$) to the predetermined percentage (P) of depletion.

5. The method according to claim 3 wherein the remaining particle bed treating capacity ($Q_R$) is calculated in accordance with the difference between the total particle bed treating capacity ($Q_T$) and the quantity of water consumed ($Q_C$).

6. The method according to claim 3 further including the steps of:
   (a) determining if the particle bed refining capacity remains depleted following initiation of regeneration; and
   (b) providing an indication when the particle bed remains depleted following regeneration.

7. A control for a water treatment device having a particle bed requiring periodic regeneration comprising:
   a flowmeter for measuring the volume of flow leaving the water treatment device;
   a particle bed sensor for sensing when the treating capacity of the particle bed has been depleted to a predetermined percentage of the toal particle bed treating capacity; and
   a controller for controlling a water treatment device to initiate regeneration of the particle bed including
   a timer for measuring the passage of time;
   a memory for storing data indicative of the quantity of treated water used over a period of days in accordance with the flow measured by said flow meter; and
   a central processor coupled to said timer and to said memory for determining the total quantity of treated water consumed since the previous regeneration and the actual average daily quantity of treated water consumed and establishing a treated water reserve quantity indicative of the amount of treated water likely to be consumed prior to the next possible regeneration as a proportion of the actual average daily quantity of treated water consumed, said central processor coupled to said particle bed sensor for determining the remaining particle bed treating capacity in accordance with a set relationship between the total quantity of treated water consumed since the last regeneration and the predetermined percentage of particle bed treating capacity depletion as sensed by said particle bed sensor and said central processing unit initiating regeneration of the water treatment device particle bed when the determined remaining particle bed treating capacity is less than the established treated water reserve.

8. The invention according to claim 7 further including an indicator coupled to said central processing unit for indicating when the particle bed treating capacity remains depleted not withstanding initiation of regeneration.

9. In combination with a control for a water treatment device having a particle bed for initiating regeneration of the particle bed, the improvement comprising:
   a particle bed sensor for sensing when the particle bed has been depleted to a predetermined percentage of the total particle bed treating capacity;
   an indicator for indicating that no regeneration of the particle bed has occurred; and
   a circuit responsive to initiation of particle bed regeneration by the control and coupled to said indicator and said particle bed sensor for energizing said indicator following initiation of regeneration if said particle bed sensor senses that the particle bed is depleted to said predetermined percentage of its total treating capacity.

* * * * *

UNITED STATES PATENT AND TRADEMARK OFFICE
CERTIFICATE OF CORRECTION

PATENT NO. : 4,469,602  
DATED : September 4, 1984  
INVENTOR(S) : J. David Seal Page 1 of 2

It is certified that error appears in the above—identified patent and that said Letters Patent is hereby corrected as shown below:

IN THE ABSTRACT:

Line 14, "capcity" should be --capacity--.

Col. 3, line 1, "softer" should be --softener--.
Col. 5, line 55, "and a air" should be --and an air--.
Col. 8, line 45, "desired, To enable" should be --desired. To enable--.
Col. 12, line 26, "righward" should be --rightward--.
Col. 13, line 52, "themotor" should be --the motor--.
Col. 14, line 22, "$P_{24}-P_{27}$" should be --$P_{24}-P_{27}$,--.

UNITED STATES PATENT AND TRADEMARK OFFICE
CERTIFICATE OF CORRECTION

PATENT NO. : 4,469,602

DATED : September 4, 1984

INVENTOR(S) : J. David Seal

It is certified that error appears in the above—identified patent and that said Letters Patent is hereby corrected as shown below:

Col. 14, line 54, "suitably" should be --switchably--.

Col. 15, line 23, "transistors 146" should be --transistor 146--.

Col. 15, line 31, "pins $P_{13}$ and pin $P_{12}$" should be --pins $P_{13}$ and $P_{12}$--.

Col. 17, line 3, "which of any" should be --which if any--.

Col. 17, line 31, "L.E.D.'s" should be --L.E.D.--.

Col. 18, line 14, "powre" should be --power--.

Col. 21, line 14, "279.9" should be --Step 279.9--.

Col. 21, line 19, "279.1" should be --Step 279.1--.

Col. 22, line 12, "to to program" should be --to program--.

Col. 22, line 21, "step 286" should be --Step 286--.

Col. 27, line 25, "toal" should be --total--.

Signed and Sealed this

Twenty-third Day of July 1985

[SEAL]

Attest:

DONALD J. QUIGG

Attesting Officer Acting Commissioner of Patents and Trademarks